US012386372B2

(12) United States Patent
Bertolotti et al.

(10) Patent No.: US 12,386,372 B2
(45) Date of Patent: Aug. 12, 2025

(54) APPARATUS AND METHOD FOR REGULATION AND BALANCING OF A THERMAL SYSTEM

(71) Applicant: I.V.A.R. S.P.A., Prevalle (IT)

(72) Inventors: Umberto Bertolotti, Prevalle (IT); Cristian Pedrotti, Prevalle (IT)

(73) Assignee: I.V.A.R. S.P.A., Prevalle (IT)

( * ) Notice: Subject to any disclaimer, the term of this patent is extended or adjusted under 35 U.S.C. 154(b) by 74 days.

(21) Appl. No.: 18/563,825

(22) PCT Filed: May 23, 2022

(86) PCT No.: PCT/IB2022/054804
§ 371 (c)(1),
(2) Date: Nov. 22, 2023

(87) PCT Pub. No.: WO2022/254283
PCT Pub. Date: Dec. 8, 2022

(65) Prior Publication Data
US 2024/0248500 A1    Jul. 25, 2024

(30) Foreign Application Priority Data

May 31, 2021   (IT) .................... 102021000014258

(51) Int. Cl.
*G05D 23/19*   (2006.01)
*F24D 3/10*   (2006.01)
(Continued)

(52) U.S. Cl.
CPC ........... *G05D 23/1931* (2013.01); *F24D 3/10* (2013.01); *F24D 19/1009* (2013.01);
(Continued)

(58) Field of Classification Search
CPC .... G05D 23/1931; G05D 16/028; F24D 3/10; F24D 19/1009; F24D 2220/0264; F24D 2220/0292
See application file for complete search history.

(56) References Cited

U.S. PATENT DOCUMENTS

| 5,433,237 A | * | 7/1995 | Kao ........................ G05D 16/10 137/484.4 |
| 6,381,946 B1 | * | 5/2002 | Wernberg ................ F02C 9/263 60/39.281 |

(Continued)

FOREIGN PATENT DOCUMENTS

| EP | 0423496 A2 | 4/1991 |
| EP | 0423496 A3 | 7/1991 |
| WO | 2019082189 A1 | 5/2019 |

OTHER PUBLICATIONS

International Search Report and Written Opinion dated Aug. 26, 2022 in corresponding International Application No. PCT/IB2022/054804, 11 pages.

*Primary Examiner* — William M McCalister
(74) *Attorney, Agent, or Firm* — MH2 TECHNOLOGY LAW GROUP LLP

(57) ABSTRACT

An apparatus configured to regulate the circulation of a fluid in a thermal plant includes a differential pressure regulator, a three-way selection valve, and a two-way zone valve. The apparatus can be installed according to a plurality of installation modes, in which: the differential pressure regulator intercepts the delivery circuit or the return circuit of the plant; the two-way zone valve intercepts the delivery circuit or the return circuit; the three-way selection valve is operatively interposed between the delivery circuit and the return circuit; a first inlet/outlet terminal of the three-way selection valve is placed in fluid communication with a high-pressure inlet or a low-pressure inlet of the differential pressure (Continued)

regulator; a second inlet/outlet terminal of the three-way selection valve is in fluid communication with a point of the delivery circuit or of the return circuit; and a third inlet/outlet terminal of the three-way selection valve is in fluid communication with a respective point of the return circuit, if the second inlet/outlet terminal is in communication with the delivery circuit, or of the delivery circuit, if the second inlet/outlet terminal is in communication with the return circuit.

18 Claims, 6 Drawing Sheets

(51) Int. Cl.
    *F24D 19/10*     (2006.01)
    *G05D 16/00*     (2006.01)
(52) U.S. Cl.
    CPC ... *G05D 16/028* (2019.01); *F24D 2220/0264* (2013.01); *F24D 2220/0292* (2013.01)

(56) References Cited

U.S. PATENT DOCUMENTS

| | | | |
|---|---|---|---|
| 8,348,630 B2* | 1/2013 | Tysver | F02C 9/30 |
| | | | 417/220 |
| 9,010,360 B1* | 4/2015 | Older | G05B 15/02 |
| | | | 137/599.05 |
| 9,239,010 B2* | 1/2016 | Benezech | F02C 9/263 |
| 9,298,191 B2* | 3/2016 | Meyer | G01M 3/28 |
| 9,435,311 B2* | 9/2016 | Snodgrass | F02C 7/232 |
| 10,126,762 B2* | 11/2018 | Loos | G05D 7/0126 |
| 11,054,295 B2* | 7/2021 | Heizenroeder | E03B 7/071 |
| 11,703,134 B2* | 7/2023 | Rickis | F16K 31/1221 |
| | | | 60/734 |
| 2012/0103440 A1 | 5/2012 | Chizek et al. | |
| 2024/0248500 A1* | 7/2024 | Bertolotti | G05D 23/1931 |

* cited by examiner

APPARATUS AND METHOD FOR REGULATION AND BALANCING OF A THERMAL SYSTEM

CROSS-REFERENCE TO RELATED APPLICATIONS

This application is a U.S. National Stage application of PCT/IB2022/054804, filed May 23, 2022, pending, which claims priority to Italian Patent Application No. 102021000014258, filed May 31, 2021, the entire disclosures of which are hereby incorporated by reference in their entireties.

The object of the present invention is a regulation apparatus for thermal plants. In particular, the present invention regards an apparatus for controlling and regulating the distribution of a fluid, typically water, within a thermal plant or a part of this. In addition, the present invention regards a method for regulating the circulation of fluid in a thermal plant, in particular for controlling the circulation of water for heating.

The invention advantageously can be applied in the technical field of thermohydraulic plants for distributing heating water in civil, commercial or industrial settings. The invention is particularly suitable for use for the so-called "balancing" of the plants, possibly also in combination with metering functions.

As is known, a thermal plant for heating (and/or cooling) comprises a series of hydraulic circuits which provide heating water (and/or cooling water) to a set of "terminals", i.e. devices which are typically involved with heating, ore more generally climate-controlling, the environment where they are situated. The terminals can for example be radiant bodies such as heaters or radiators, or convectors, coils for floor heating, heat exchangers, user devices, etc.

Within a thermal plant it is possible to identify a primary side and a secondary side. The primary side corresponds with the side for generating and sending hot water for heating, and typically comprises a central heating plant (e.g. a boiler), a primary pump and further components. Conversely, the secondary side corresponds with the set of terminals which use the heating water; with "secondary side" the following can each time be identified: a single apartment, a unit within a condominium, a set or rooms or a subgroup of terminals, depending on the design. Typically the secondary side can be directly connected to the primary side, or the secondary side can be hydraulically uncoupled with respect to the primary side, for example if between the two sides a heat exchanger was interposed.

In any case the plant typically provides for a "delivery", i.e. a branch of the circuit that extends from the primary side to the secondary side, in order to supply the terminals, and a "return", i.e. a branch of the circuit that extends from the secondary side to the primary side, in order to bring the hot water back into the central heating plant and complete the circulation of the fluid.

A thermal plant requires a set of hydraulic devices necessary for its correct operation. A function that is particularly important in managing a thermal plant is the so-called "balancing".

By "balancing" it is typically intended the management of the circulation of the heating water in the plant in order to provide to the different terminals, over time, the right quantity of heating water, as a function of the design flow rate defined by the designer for each terminal or group of terminals.

The balancing can be implemented according to different modes.

The first is represented by the so-called static balancing. For example, one imagines a multi-story building, in which—in the absence of suitable regulations—it is difficult to reach the highest floors due to the distance of the central heating plant and due to the presence of the intermediate floors, which absorb the flow of hot water produced. In order to overcome this problem, it is known to introduce localized load losses by means of static balancing valves, in a manner such to equip the pressures (or load losses) at play so that each floor, apartment or group of terminals is reached by the correct quantity of heating water. In other words the ducts that supply heating water to the terminals/apartments closer to the primary pump are obstructed/narrowed in a manner such that the water is suitably divided along the path. With the adjective "static", it is intended that the balancing is carried out by positioning valves or narrowing in specific positions and then leaving unaltered such valves and the respective positions.

The static balancing necessarily has limits, since the regulation is not effective in the transient situations (start of heating, greater or lower requests for hot water at the various points of the plant) and, generally, due to the fact that the modern and sophisticated plants are not designed for operating with a balancing of this type. For example, in a building with different floors and a plurality of apartments, the turning off of the heating in one or more of these determines a reduction of the total flow, and hence of the flow requested of the primary pump: however this generates an increase of the hydraulic head of the pump, and this can cause a surplus of supply of heating water (not desired) for the other still active apartments. In addition, the static balancing has the limit of being sized typically on the maximum load conditions of the plant, even if the plant does not often operate in such condition.

The static balancing, typically in use in the most dated plants, is superseded by the balancing that is so-called "dynamic", which provides for inserting specific devices on the various branches of the plant, upstream or downstream of each single apartment, terminal or group of terminals, where such devices react dynamically to the variations that can appear in the hydraulic plant due to the fact that each terminal and/or apartment has—over time—a specific operation (closings and openings of specific terminals, greater or lower heating request, etc.).

A first type of dynamic balancing is attained by means of a differential pressure regulator or DPCV (Differential Pressure Control Valve), which is involved for maintaining constant the pressure difference between two points of hydraulic circuit, typically between delivery and return. In such a manner, at the terminals constituting the secondary side (e.g. an apartment) on which the DPCV regulator is installed, heating water is supplied, always with a constant pressure differential, regardless of the fluctuations present on the primary side and typically introduced by the variations in use of the other secondary sides present in the plant (e.g. the other apartments).

A second type of dynamic balancing is attained by means of a regulator independent of the differential pressure or PICV (Pressure Independent Control Valve), which is instead involved with maintaining constant the flow of heating water supplied to the secondary side, regardless of the pressure variations entering the secondary side itself, typically due to openings/closures in other branches of the plant.

The selection of the first or of the second type of dynamic balancing to be implemented for a specific secondary side of the plant can be carried out on the basis of the type of terminals present in such secondary side, e.g. if these are radiators coils for floor heating, or in the case of coolers.

The Applicant has encountered that the known solutions are not free of drawbacks and can be improved with regard to several aspects.

First of all, the known regulators for attaining balancing of the plant have a rigid structure and fixed operating modes, which are hard to adapt in an effective manner to the multiplicity of different plant types, of secondary sides and terminals that use heating water within an apartment or a building.

The known solutions, in substance, have a poor versatility of use in different contexts. This introduces difficulties for designers and installers of thermo-hydraulic plants, who do not have solutions that can be adapted to the specific characteristics of each installation.

In general, the known solutions do not always allow an optimal regulation of the flow of heating water between delivery and return of a secondary side of a thermal plant.

In addition, the known solutions might not be able, in specific conditions, of correctly supplying, in terms of temperature, flow rate and/or pressure, the single terminals or groups of terminals of the plant operating with flows of heating water.

In general, the Applicant has observed that the performances of the known solutions are not fully satisfactory and do not fully meet the needs of the users.

In this situation, the object at the base of the present invention, in its various aspects and/or embodiments, is to provide a regulation apparatus for thermal plants and a method for regulating the circulation of fluid in a thermal plant that can be capable of overcoming one or more of the abovementioned drawbacks.

A further object of the present invention is that of proposing an apparatus and a method of regulation for thermal plants which allow obtaining an effective dynamic balancing of the plant, with improved performances with respect to the known solutions.

A further object of the present invention is that of proposing an apparatus and a method of regulation for thermal plants capable of correctly supplying, in terms of temperature, flow rate and/or pressure, the single terminals or groups of terminals of a thermal plant operating with flows of heating water.

A further object of the present invention is that of proposing an apparatus and a method of regulation for thermal plants capable of being easily adapted to different types of plant and/or of terminals present in a plant or in a part thereof.

A further object of the present invention is that of proposing an apparatus and a method of regulation for thermal plants capable of operating in a modifiable manner depending on the needs requested by a thermal plant during the operation thereof.

A further object of the present invention is that of proposing an apparatus and a method of regulation for thermal plants provided with high versatility of use in various contexts.

A further object of the present invention is that of proposing an apparatus and a method of regulation for thermal plants capable of optimally adjusting the flow of heating water and/or cooling between delivery and return of one side of a thermal plant.

A further object of the present invention is that of proposing an apparatus and a method of regulation for thermal plants capable of implementing operations for metering the energy consumptions of a thermal plant, in particular the consumptions tied to the flow of heating water between delivery and return of one side of a thermal plant.

A further object of the present invention is that of proposing a regulation apparatus for thermal plants that is simple and quick to attain and a method of regulation for thermal plants that is simple to implement.

A further object of the present invention is that of proposing a regulation apparatus for thermal plants characterized by a simple and rational structure.

Further object of the present invention is to create alternative solutions, with respect to the prior art, in making apparatuses and methods of regulation for thermal plants, and/or opening new design fields.

Such objects, and still others, which will be clearer in the course of the following description, are substantially reached by a regulation apparatus for thermal plants, a method for regulating the circulation of fluid in a thermal plant, and a hydraulic plant comprising the aforesaid apparatus, according to one or more of the enclosed claims, each of which taken separately (without the relative dependencies) or in any combination with the other claims, as well as according to the following aspects and/or embodiments, variously combined, also with the aforesaid claims.

Aspects of the invention are listed hereinbelow.

In a first aspect thereof, the invention regards a regulation apparatus for thermal plants, configured for regulating the circulation of a fluid in a thermal plant, said thermal plant comprising a primary side, which generates and provides a flow of said fluid, a secondary side, which comprises one or more terminals using such fluid, a delivery circuit, connecting the primary side to the secondary side in order to bring to the latter a flow of said fluid, and a return circuit, connecting the secondary side to the primary side in order to bring back, to the latter, the fluid used by said terminals, the apparatus being operatively placed at the ends of the secondary side in order to regulate the flow of fluid entering the secondary side from the delivery circuit and exiting from the secondary side from the return circuit.

In one aspect the apparatus comprises a differential pressure regulator (or valve) (in technical jargon "DPCV"), comprising:
- an internal duct, intended to be traversed by the fluid intercepted by the regulator;
- a high-pressure inlet (or valve), intended to be placed in communication with a flow of fluid having a specific pressure;
- a low-pressure inlet (or valve), intended to be placed in communication with a respective flow of fluid having a specific pressure;

the differential pressure regulator being configured for varying or modulating the passage (or the flow rate) of fluid through the internal duct in a manner such to maintain constant the pressure difference value between (the pressured received, or detected, or perceived by) the high-pressure inlet and (the pressured received, or detected, or perceived by) the low-pressure inlet, said pressure difference value being selectable in a use interval of the differential pressure regulator (or equal to a fixed value).

In one aspect the apparatus comprises a three-way selection valve, comprising:
- a first inlet/outlet terminal, intended to be placed in fluid communication with a point of the plant or of the apparatus;

a second inlet/outlet terminal, intended to be placed in fluid communication with a respective point of the plant or of the apparatus;

a third inlet/outlet terminal, intended to be placed in fluid communication with a respective point of the plant or of the apparatus;

the three-way selection valve being configured at least for selectively placing in fluid communication:

said first inlet/outlet terminal with said second inlet/outlet terminal, simultaneously closing the third inlet/outlet terminal, in accordance with a first operating position, or said first inlet/outlet terminal with said third inlet/outlet terminal, simultaneously closing the second inlet/outlet terminal, in accordance with a second operating position.

In one aspect the apparatus comprises a two-way zone valve, comprising:

a fluid inlet;

a fluid outlet;

a passage duct, extended between the fluid inlet and the fluid outlet and intended to be traversed by the fluid intercepted by the two-way zone valve and circulating from the inlet to the fluid outlet;

the two-way zone valve being configured for allowing the circulation of a flow of fluid through said passage duct equal to a specific flow rate value selectable for the zone valve.

In one aspect the apparatus is configured for being installed in accordance with a plurality of installation modes.

In one aspect, in each installation mode:

the differential pressure regulator is placeable in a manner such to intercept the delivery circuit or the return circuit, said internal duct thus being traversed by the fluid circulating in the delivery circuit or in the return circuit;

the two-way zone valve is placeable so as to intercept the delivery circuit or the return circuit, in a manner such that said passage duct is traversed by the fluid circulating in the delivery circuit or in the return circuit;

the three-way selection valve is intended to be operatively interposed between the delivery circuit and the return circuit;

the first inlet/outlet terminal is intended to be placed in fluid communication with the high-pressure inlet or with the low-pressure inlet of the differential pressure regulator;

the second inlet/outlet terminal is intended to be placed in fluid communication with a point of the delivery circuit or of the return circuit;

the third inlet/outlet terminal is intended to be placed in fluid communication with a respective point of the return circuit, if the second inlet/outlet terminal is in fluid communication with the delivery circuit, or of the delivery circuit, if the second inlet/outlet terminal is in fluid communication with the return circuit.

In one aspect, in accordance with a first installation mode of the apparatus (FIGS. 1-2, 5-6, 9-10):

the differential pressure regulator is placeable so as to intercept the delivery circuit or the return circuit;

the two-way zone valve is placeable in a point downstream with respect to the pressure regulator along the circulation sense of the fluid in the plant, intercepting the delivery circuit or the return circuit.

In one aspect, in accordance with a second installation mode of the apparatus (FIGS. 3-4, 7-8, 11-12):

the differential pressure regulator is placeable so as to intercept the delivery circuit or the return circuit;

the two-way zone valve is placeable in a point upstream with respect to the pressure regulator along the circulation sense of the fluid in the plant, intercepting the delivery circuit or the return circuit.

In one aspect, the first installation mode is attained in accordance with a first configuration, in which:

the differential pressure regulator and the two-way zone valve are both placed along the delivery circuit;

the high-pressure inlet of the differential pressure regulator is intended to be fluidly connected with the delivery circuit, at a first connection point placed downstream, along the circulation sense of the fluid in the plant, with respect to the position of the differential pressure regulator;

the low-pressure inlet of the differential pressure regulator is intended to be fluidly connected with the first inlet/outlet terminal of the three-way selection valve;

the second inlet/outlet terminal of the three-way selection valve is intended to be fluidly connected with the delivery circuit, at a second connection point placed downstream with respect to the position of the two-way zone valve;

the third inlet/outlet terminal of the three-way selection valve is intended to be fluidly connected with the return circuit, at a third connection point.

In one aspect, the second installation mode is attained in accordance with a second configuration, in which:

the differential pressure regulator and the two-way zone valve are both placed along the return circuit;

the low-pressure inlet of the differential pressure regulator is intended to be fluidly connected with the return circuit, at a first connection point placed upstream, along the circulation sense of the fluid in the plant, with respect to the position of the differential pressure regulator;

the high-pressure inlet of the differential pressure regulator is intended to be fluidly connected with the first inlet/outlet terminal of the three-way selection valve;

the second inlet/outlet terminal of the three-way selection valve is intended to be fluidly connected with the return circuit, at a second connection point placed upstream with respect to the position of the two-way zone valve;

the third inlet/outlet terminal of the three-way selection valve is intended to be fluidly connected with the delivery circuit, at a third connection point.

In one aspect, the first installation mode is attained in accordance with a third configuration, in which:

the differential pressure regulator is placed along the delivery circuit;

the two-way zone valve is placed along the return circuit;

the low-pressure inlet of the differential pressure regulator is intended to be fluidly connected with the return circuit, at a first connection point placed downstream, along the circulation sense of the fluid in the plant, with respect to the position of the two-way zone valve;

the high-pressure inlet of the differential pressure regulator is intended to be fluidly connected with the first inlet/outlet terminal of the three-way selection valve;

the second inlet/outlet terminal of the three-way selection valve is intended to be fluidly connected with the return circuit, at a second connection point placed upstream with respect to the position of the two-way zone valve;

the third inlet/outlet terminal of the three-way selection valve is intended to be fluidly connected with the delivery circuit, at a third connection point.

In one aspect, the second installation mode is attained in accordance with a fourth configuration, in which:

the differential pressure regulator is placed along the return circuit;

the two-way zone valve is placed along the delivery circuit;

the high-pressure inlet of the differential pressure regulator is intended to be fluidly connected with the delivery circuit, at a first connection point placed upstream, along the circulation sense of the fluid in the plant, with respect to the position of the two-way zone valve;

the low-pressure inlet of the differential pressure regulator is intended to be fluidly connected with the first inlet/outlet terminal of the three-way selection valve;

the second inlet/outlet terminal of the three-way selection valve is intended to be fluidly connected with the delivery circuit, at a second connection point placed downstream with respect to the position of the two-way zone valve;

the third inlet/outlet terminal of the three-way selection valve is intended to be fluidly connected with the return circuit, at a third connection point.

In one aspect, the first installation mode is attained in accordance with a fifth configuration, in which:

the differential pressure regulator and the two-way zone valve are both placed along the return circuit;

the low-pressure inlet of the differential pressure regulator is intended to be fluidly connected with the return circuit, at a first connection point placed downstream, along the circulation sense of the fluid in the plant, with respect to the position of the two-way zone valve;

the high-pressure inlet of the differential pressure regulator is intended to be fluidly connected with the first inlet/outlet terminal of the three-way selection valve;

the second inlet/outlet terminal of the three-way selection valve is intended to be fluidly connected with the return circuit, at a second connection point placed upstream with respect to the position of the two-way zone valve;

the third inlet/outlet terminal of the three-way selection valve is intended to be fluidly connected with the delivery circuit, at a third connection point.

In one aspect, the second installation mode is attained in accordance with a sixth configuration, in which:

the differential pressure regulator and the two-way zone valve are both placed along the delivery circuit;

the high-pressure inlet of the differential pressure regulator is intended to be fluidly connected with the delivery circuit, at a first connection point placed upstream, along the circulation sense of the fluid in the plant, with respect to the position of the two-way zone valve;

the low-pressure inlet of the differential pressure regulator is intended to be fluidly connected with the first inlet/outlet terminal of the three-way selection valve;

the second inlet/outlet terminal of the three-way selection valve is intended to be fluidly connected with the delivery circuit, at a second connection point placed immediately downstream with respect to the position of the two-way zone valve;

the third inlet/outlet terminal of the three-way selection valve is intended to be fluidly connected with the return circuit, at a third connection point.

In one aspect the apparatus is structured for selectively operating at least between a first operating mode and a second operating mode, selectively selectable by means of the positioning of the three-way selection valve, respectively in the first operating position and in the second operating position, in which:

in the first operating mode:

one between the high-pressure inlet and the low-pressure inlet of the differential pressure regulator detects the pressure of the fluid coming from said first connection point;

conversely, the other of the two inlets of the differential pressure regulator (that not employed in the preceding point), i.e. one between the low-pressure inlet and the high-pressure inlet of the differential pressure regulator, detects the pressure of the fluid coming from said second connection point, so that the three-way selection valve is in the first operating position and allows a communication (passage) of fluid between the first and the second inlet/outlet terminal;

the third inlet/outlet terminal of the three-way selection valve is closed;

thus the pressure distance—in absolute terms—between second connection point and first connection point, i.e. at the ends of the two-way zone valve, being maintained constant, the apparatus overall attaining, at the ends of the secondary side, a dynamic balancing independent of the pressure and at constant flow rate, selectable by means of the two-way zone valve, towards the secondary side;

in the second operating mode:

one between the high-pressure inlet and the low-pressure inlet of the differential pressure regulator detects the pressure of the fluid coming from said first connection point;

conversely, the other of the two inlets of the differential pressure regulator (that not employed in the preceding point), i.e. one between the low-pressure inlet and the high-pressure inlet of the differential pressure regulator detects the pressure of the fluid coming from said third connection point, so that the three-way selection valve is in the second operating position and allows the communication (passage) of fluid between the first and the third inlet/outlet terminal;

the second inlet/outlet terminal of the three-way selection valve is closed;

thus the pressure distance—in absolute terms—between third connection point and first connection point, i.e. at the ends of the entire secondary side, being maintained constant, the apparatus overall attaining, at the ends of the secondary side, a dynamic balancing with constant pressure difference and with variable flow rate.

In one aspect said first operating mode and said second operating mode of the apparatus are selectable, and operate in the same manner, both if the apparatus is configured according to said first installation mode, and if the apparatus is configured according to said second installation mode.

In one aspect said first operating mode and said second operating mode of the apparatus are selectable, and operate in the same manner, if the differential pressure regulator and the two-way zone valve are placed along the delivery circuit, and if the differential pressure regulator and the two-way zone valve are situated along the return circuit.

In one aspect the two-way zone valve comprises a flow rate selector configured for defining, over time, said specific flow rate value circulating through the passage duct of the zone valve.

In one aspect the two-way zone valve is configured for being delivered by a control unit, e.g. a control unit of the thermal plant or a processing unit, in a manner such to receive a control signal configured for establishing, over time, said specific flow rate value of the valve.

In one aspect the two-way zone valve is manually controllable, for example by means of a knob, acting on said flow rate selector in order to define said specific flow rate value.

In one aspect the differential pressure regulator comprises a body provided with said high-pressure inlet and with said low-pressure inlet, and defining at its interior:
  a high-pressure chamber, connected to said high-pressure inlet; and
  a low-pressure chamber, connected to said low-pressure inlet,
in which, between said high-pressure chamber and said low-pressure chamber, movable element is placed, preferably a disc or equalizing membrane, having a high-pressure side, communicating with said high-pressure chamber and against which the pressure of the fluid present in the high-pressure chamber impacts, and a low-pressure side, communicating with said low-pressure chamber and against which the pressure of the fluid present in the low-pressure chamber impacts.

In one aspect the movable element is connected to a shutter active on a passage section of the internal duct of the differential pressure regulator, in a manner such that the position and/or the shape of the movable element defines the size of the passage section of the internal duct, and a movement or contraction of the movable element varies the size of the passage section of the internal duct.

In one aspect the differential pressure regulator comprises a contrast spring placed, in one possible embodiment, in the low-pressure chamber and impacting on the movable element, the contrast spring being regulatable (by means of variation of the preload) in a manner such to define a specific position of the movable element as a function of the desired pressure difference value that one wishes to maintain constant between the high-pressure chamber and the low-pressure chamber.

In one aspect the differential pressure regulator is configured in a manner such that variations or fluctuations of the pressure in the high-pressure chamber and/or in the low-pressure chamber determine the movement or the contraction of the movable element, based on the adjustment of the contrast spring, such to restore the selected pressure different value between high-pressure chamber and low-pressure chamber.

In one aspect the differential pressure regulator comprises a regulation knob, acting on said contrast spring, in order to select the desired pressure difference value, to be maintained constant, between the high-pressure chamber and the low-pressure chamber.

In one aspect the differential pressure regulator comprises an actuator, possibly remote-controllable, for example between a control unit, configured for defining the desired pressure difference value, to be maintained constant, between the high-pressure chamber and the low-pressure chamber.

In one aspect one between the low-pressure chamber and the high-pressure chamber of the differential pressure regulator is directly communicating with the internal duct of the regulator itself, in which the fluid circulates which flows through the regulator, i.e. such chamber is directly supplied by the fluid that traverses the regulator.

In such case the pressure present in the chamber communicating directly with the internal duct, and impacting one side of the movable element, corresponds with the pressure of the fluid that circulates in the circuit intercepted by the differential pressure regulator.

In one aspect:
In one aspect, with the apparatus in said first operating mode:
  the two-way zone valve, configured for selecting a specific flow of fluid passing through it, fixes a geometry for the fluid circulating in the secondary side;
  the differential pressure regulator maintains constant the pressure difference (in absolute value) at the ends, i.e. between upstream and downstream, of the two-way zone valve, i.e. between second connection point and first connection point;
  in this manner, by means of the selection operated with the two-way zone valve and the action of the differential pressure regulator for maintaining the constant pressure difference, one obtains a constant flow rate in the secondary side with said fixed geometry.

In one aspect the two-way zone valve is configured for modulating, on the basis of a setting command, said specific flow rate value of fluid passing through it, and such modulation causes a variation of the hydraulic geometry in the secondary side, against which the pressure difference impacts at the ends of the two-way zone valve, i.e. between second connection point and first connection point.

In one aspect, the apparatus in said first operating mode operates in a manner such that:
  the two-way zone valve sets the flow rate value desired for the secondary side (i.e. fixes the geometry);
  the differential pressure regulator acts in a manner such that said desired flow rate value is that actually resulting (the pressure difference at the ends of the two-way zone valve maintained constant).

In one aspect, with the apparatus in said first operating mode, the desired flow rate value is constant, i.e. once set by means of the two-way zone valve, it is maintained due to the differential pressure regulator, but modifiable
  over time—since the two-way zone valve allows setting different values. In other words it is possible to vary the desired flow rate value, but when it is reached such value is maintained constant.

In one aspect, the two-way zone valve provides for an operation with "constant settable and modulatable flow rate".

In one aspect, with the apparatus in said second operating mode:
  the differential pressure regulator works between the two ends of the secondary side, maintaining a constant pressure difference between delivery and return;
  in this case, the two-way zone valve becomes equivalent to a a loss in series, on the delivery or on the return, based on the installation mode of the apparatus.

In such case the zone valve can be employed, if necessary, as interception valve of the branch on which it is installed.
In one aspect, in summary:
  in said first operating mode the apparatus maintains constant the pressure difference at the ends of the two-way zone valve;
  in said second operating mode the apparatus maintains constant the pressure difference at the ends of the secondary side on which it is installed (i.e. between delivery and return, at the ends of the apparatus itself).

In one aspect the apparatus comprises a heat counter (or meter) comprising:

a volumetric counter, intended to be installed on the delivery circuit or on the return circuit, configured for measuring the quantity, or the flow rate, of fluid circulating in the circuit along which it is installed;

a delivery probe, intended to be placed at a point of the delivery circuit and configured for detecting, over time, the temperature of the fluid circulating in the delivery circuit;

a return probe, intended to be placed at a point of the return circuit and configured for detecting, over time, the temperature of the fluid circulating in the return circuit.

In one aspect the heat counter comprises a calculation unit in communication with the volumetric counter, with the delivery probe and with the return probe, in a manner such to receive:

an instantaneous flow rate value measured by said volumetric counter;

a delivery temperature value measured by said delivery probe;

a return temperature value measured by said return probe;

the calculation unit of the heat counter being configured for calculating the heat consumption, or energy consumption, associated—in a specific time interval—with the plant portion served by the apparatus, i.e. downstream of this, and in particular with the secondary side on which the apparatus is installed.

In one aspect the calculation unit of the heat counter is configured for receiving the instantaneous flow rate value, the delivery temperature value and the delivery temperature value at specific discrete time intervals.

In one aspect the calculation unit of the heat counter is configured for calculating an instantaneous power or a heat consumption/energy associated with a specific time operating interval of the plant.

In one aspect the calculation unit of the heat counter is in communication with the volumetric counter, with the delivery probe and with the return probe by means of respective wired connections and/or by means of remote connections, e.g. of wireless or radio type.

In one aspect the apparatus, when it comprises the heat counter, it is configured—in addition to performing a function of balancing the plant—also for executing a function of metering the consumptions.

In one aspect the apparatus is composed of a set of discrete components to be assembled, each provided with a respective body intended to be placed in a specific position of the plant, and in particular comprises:

a differential pressure regulator;
a three-way selection valve;
a two-way zone valve;
optionally, a heat counter;
optionally, one or more interception valves.

In an alternative aspect the apparatus is attained as a single group comprising at its interior:

a differential pressure regulator;
a three-way selection valve;
a two-way zone valve;
optionally, a heat counter;
optionally, one or more interception valves.

In one aspect said single group is a single containment body, or module, intended to be placed in a single piece in the plant, in a manner such to intercept both the delivery circuit and the return circuit.

In such case, defined within the single group are all the fluid paths and the elements of the differential pressure regulator, of the three-way selection valve and of the two-way zone valve.

In one aspect said secondary side of the plant corresponds with an apartment or residential unit, or a portion of an apartment or a group of terminals or a single terminal.

In one aspect the two-way zone valve is configured for being opened if there is request for heating by one or more terminals placed downstream of the apparatus, in the secondary side, setting said flow rate selector at a specific flow rate value greater than zero, possibly variable over time based on a command logic and as a function of the progression of the heating request.

In one aspect the two-way zone valve is configured for being closed if there is no request for heating by the terminals placed downstream of the apparatus, in the secondary side, setting said flow rate selector at a flow rate value equal to zero.

In an independent aspect thereof the present invention regards a kit of regulation for thermal plants, i.e. equipment or tools comprising:

a differential pressure regulator;
a three-way selection valve;
a two-way zone valve;
optionally, a heat counter;
optionally, one or more interception valves.

The apparatus of the present invention can be implemented in the form of a kit, i.e. equipment or tools comprising various components, where each component is intended to be installed in the plant in order to attain the operating modes of the apparatus.

Each of the components of the kit is ready to be installed in the respective position of the thermal plant. In substance, the apparatus of the present invention can be a disassembled kit (i.e. a set of components for attaining the apparatus) or kit that is mounted in the final use plant.

In an independent aspect thereof, the present invention regards a thermal plant, or thermal plant portion, comprising:

a primary side, which generates and provides a flow of heating or cooling fluid;

a secondary side, which comprises one or more terminals using such fluid;

a delivery circuit, connecting the primary side to the secondary side in order to bring, to the latter, a flow of said fluid;

a return circuit, connecting the secondary side to the primary side in order to bring back, to the latter, the fluid used by said terminals;

a regulation apparatus, according to one or more of the abovementioned aspects, configured for regulating the circulation of the fluid in the thermal plant, operatively placed at the ends of the secondary side in order to regulate the flow of fluid entering the secondary side from the delivery circuit and exiting from the secondary side from the return circuit.

In one aspect, in the aforesaid thermal plant:

the differential pressure regulator is placed so as to intercept the delivery circuit or the return circuit;

the two-way zone valve is placed so as to intercept the delivery circuit or the return circuit;

the three-way selection valve is operatively interposed between the delivery circuit and the return circuit;

the first inlet/outlet terminal is placed in fluid communication with the high-pressure inlet or with the low-pressure inlet of the differential pressure regulator;

the second inlet/outlet terminal is placed in fluid communication with a respective point of the delivery circuit or of the return circuit;

the third inlet/outlet terminal is placed in fluid communication with a respective point of the return circuit, if the second inlet/outlet terminal is in fluid communication with the delivery circuit, or of the delivery circuit, if the second inlet/outlet terminal is in fluid communication with the return circuit.

In one aspect thereof the present invention regards a thermal plant comprising an apparatus according to one or more of the abovementioned aspects.

In the scope of the present invention, all the aspects relative to the apparatus and to its components, in particular the differential pressure regulator, the two-way zone valve and the three-way selection valve, are identically applicable also to the plant according to the present invention.

In an independent aspect thereof, the present invention regards a method for regulating and balancing the circulation of fluid in a thermal plant comprising:
 a primary side, which generates and provides a flow of heating or cooling fluid;
 a secondary side, which comprises one or more terminals using such fluid;
 a delivery circuit, connecting the primary side to the secondary side in order to bring to the latter a flow of said fluid;
 a return circuit, connecting the secondary side to the primary side in order to bring back, to the latter, the fluid used by said terminals,
the method comprising the step of arranging a regulation apparatus according to one or more of the abovementioned aspects.

In one aspect the method comprises the step of:
 executing an installation in accordance with a first mode which provides for the following steps:
  installing the differential pressure regulator by placing it such that it intercepts the delivery circuit or the return circuit;
  installing the two-way zone valve by placing it in a point downstream with respect to the pressure regulator along the circulation sense of the fluid in the plant, intercepting the delivery circuit or the return circuit;
  installing the three-way selection valve operatively interposing it between the delivery circuit and the return circuit;
  fluidly connecting the first inlet/outlet terminal with the high-pressure inlet or with the low-pressure inlet of the differential pressure regulator;
  fluidly connecting the low-pressure inlet, if the high-pressure inlet is connected to the first inlet/outlet terminal, or the high-pressure inlet, if the low-pressure inlet is connected to the first inlet/outlet terminal, with the delivery circuit or the return circuit, at a first connection point;
  fluidly connecting the second inlet/outlet terminal with a second connection point defined on the delivery circuit or on the return circuit;
  fluidly connecting the third inlet/outlet terminal with a third connection point defined on the return circuit, if the second inlet/outlet terminal is connected to the delivery circuit, or on the delivery circuit, if the second inlet/outlet terminal is connected to the return circuit;

or, alternatively, executing an installation in accordance with a second mode which provides for the following steps:
  installing the differential pressure regulator by placing it such that it intercepts the delivery circuit or the return circuit;
  installing the two-way zone valve by placing it in a point upstream with respect to the pressure regulator along the circulation sense of the fluid in the plant, intercepting the delivery circuit or the return circuit;
  installing the three-way selection valve operatively interposing it between the delivery circuit and the return circuit;
  fluidly connecting the first inlet/outlet terminal with the high-pressure inlet or with the low-pressure inlet of the differential pressure regulator;
  fluidly connecting the low-pressure inlet, if the high-pressure inlet is connected to the first inlet/outlet terminal, or the high-pressure inlet, if the low-pressure inlet is connected to the first inlet/outlet terminal, with the delivery circuit or the return circuit, at a first connection point;
  fluidly connecting the second inlet/outlet terminal with a second connection point defined on the delivery circuit or on the return circuit;
  fluidly connecting the third inlet/outlet terminal with a third connection point defined on the return circuit, if the second inlet/outlet terminal is connected to the delivery circuit, or on the delivery circuit, if the second inlet/outlet terminal is connected to the return circuit.

In one aspect the method also comprises the step of selectively positioning the three-way selection valve in the first operating position or in the second operating position, in a manner such to select—respectively—a first operating mode or a second operating mode, in which:
 in the first operating mode:
  one between the high-pressure inlet and the low-pressure inlet of the differential pressure regulator detects the pressure of the fluid coming from said first connection point;
  conversely, the other between the low-pressure inlet and the high-pressure inlet of the differential pressure regulator detects the pressure of the fluid coming from said second connection point, so that the three-way selection valve is in the first operating position and allows the fluid communication between the first and the second inlet/outlet terminal;
  the third inlet/outlet terminal of the three-way selection valve is closed;
  the pressure difference is maintained constant between second connection point and first connection point, i.e. at the ends of the two-way zone valve,
  the method overall attains, at the ends of the secondary side, a dynamic balancing independent of the pressure and with constant flow rate, selectable by means of the two-way zone valve, towards the secondary side;
 in the second operating mode:
  one between the high-pressure inlet and the low-pressure inlet of the differential pressure regulator detects the pressure of the fluid coming from said first connection point;
  conversely, the other between the low-pressure inlet and the high-pressure inlet of the differential pressure regulator detects the pressure of the fluid coming from said third connection point, so that the three-way selection valve is in the second operating position and allows the fluid communication between the first and the third inlet/outlet terminal;

the second inlet/outlet terminal of the three-way selection valve is closed;

the pressure difference is maintained constant between third connection point and first connection point, i.e. at the ends of the entire secondary side, the method overall attains, at the ends of the secondary side, a dynamic balancing with constant pressure difference and with variable flow rate.

In one aspect, said step of selectively positioning the three-way selection valve in the first operating position or in the second operating position, in order to select the operating mode, is manually executed, e.g. by means of a lever or a knob, or automatically based on a selection command sent to the three-way selection valve, e.g. from a control unit for controlling the plant.

In one aspect thereof the present invention regards a method for regulating the circulation of fluid in a thermal plant implemented by means of an apparatus according to one or more of the abovementioned aspects.

It is observed that, in the scope of the present description, and of the enclosed claims, the technical characteristics set forth in the aspects referred to the regulation apparatus for thermal plants also hold true for the method for regulating the circulation of fluid in a thermal plant.

Each of the aforesaid aspects of the invention can be taken separately or in combination with any one of the claims or of the other described aspects.

Further characteristics and advantages will be clearer from the detailed description of several embodiments, also including a preferred embodiment, which are given only as examples of a regulation apparatus for thermal plants, a method for regulating and balancing the circulation of fluid in a thermal plant, and a hydraulic plant comprising the aforesaid apparatus, in accordance with the present invention. Such description will be set forth hereinbelow with reference to the enclosed drawings, only provided as a non-limiting example, in which.

With reference to the abovementioned figures, reference number 1 overall indicates a regulation apparatus for thermal plants, in accordance with the present invention. In general, the same reference number is used for equivalent or similar elements, possibly in their embodiment variants.

Figure 1:
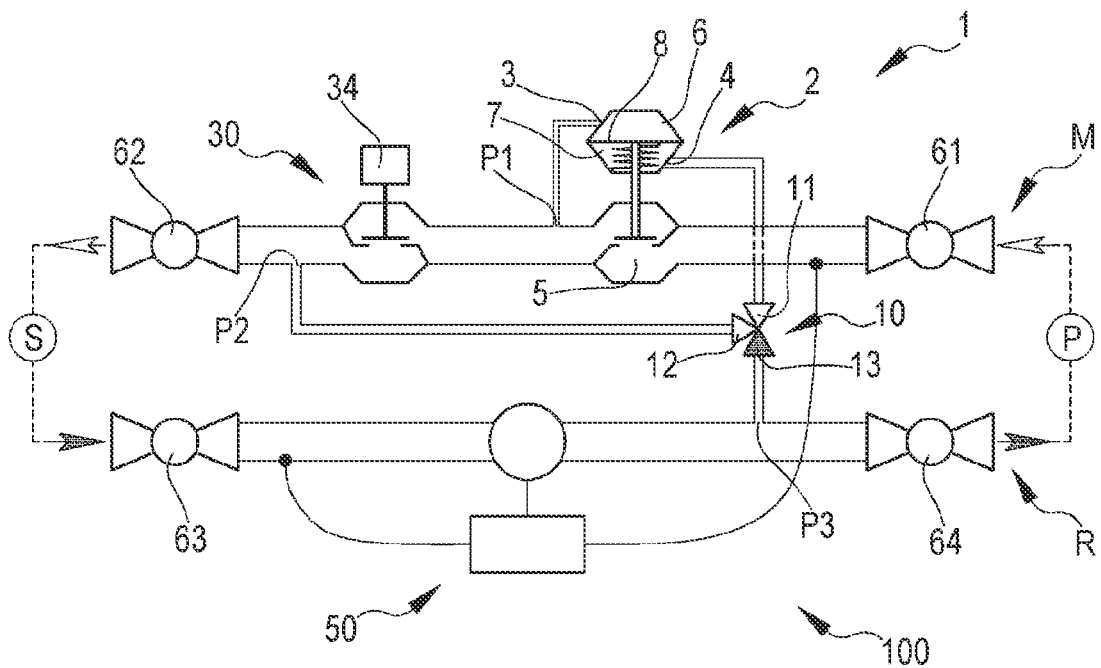
FIG. 1 shows a schematic representation of a regulation apparatus for thermal plants according to the present invention, installed at the ends of a secondary side of a thermal plant, in accordance with a first exemplifying embodiment and operating in a first operating mode.

The regulation apparatus 1 for thermal plants is shown schematically in FIG. 1. It is first of all observed that the apparatus is illustrated already installed in a thermal plant, i.e. associated with a portion of a thermal or thermo-hydraulic plant.

The apparatus 1 is configured for regulating the circulation of a fluid in a thermal plant, indicated in the figures with reference number 100. Such thermal plant 100 comprises typically:

a primary side P, which generates and provides a flow of fluid, typically hot water for heating or cold water for cooling;

a secondary side S, which comprises one or more terminals using such fluid;

a delivery circuit M, connecting the primary side P to the secondary side S in order to bring to the latter a flow of fluid; and a return circuit R, connecting the secondary side S to the primary side P in order to bring back, to the latter, the fluid used by the terminals.

The apparatus 1 is operatively placed at the ends of the secondary side S in order to regulate the flow of fluid entering the secondary side from the delivery circuit M and exiting from the secondary side from the return circuit R.

The apparatus 1 comprises a differential pressure regulator (or valve) 2 (in technical jargon "DPCV", Differential Pressure Control Valve), comprising:

an internal duct 5, intended to be traversed by the fluid intercepted by the regulator;

a high-pressure inlet (or valve) 3, in communication with a flow of fluid having a specific pressure;

a low-pressure inlet (or valve) 4, in communication with a respective flow of fluid having a specific pressure.

The differential pressure regulator 2 is configured for varying or modulating the passage (or the flow rate) of fluid through the internal duct in a manner such to maintain constant the pressure difference value between the high-pressure inlet 3 and the low-pressure inlet 4, in which such pressure difference value is selectable in a use interval of the differential pressure regulator 2. Alternatively, the pressure difference value can be a fixed value, i.e. not regulatable.

The differential pressure regulator 2 maintains constant the pressure difference value between the pressure received or detected or perceived by the high-pressure inlet 3 and the pressure received or detected or perceived by the low-pressure inlet 4.

The apparatus 1 comprises a three-way selection valve 10, comprising:

a first inlet/outlet terminal 11, placed in fluid communication with a point of the plant or of the apparatus;

a second inlet/outlet terminal 12, placed in fluid communication with a respective point of the plant or of the apparatus;

a third inlet/outlet terminal 13, placed in fluid communication with a respective point of the plant or of the apparatus.

The three-way selection valve 10 is configured for selectively placing in fluid communication:

the first inlet/outlet terminal 11 with the second inlet/outlet terminal 12, simultaneously closing the third inlet/outlet terminal 13, when it is situated in a first operating position, or the first inlet/outlet terminal 11 with the third inlet/outlet terminal 13, simultaneously closing the second inlet/outlet terminal 12, when it is situated in a second operating position.

The apparatus 1 also comprises a two-way zone valve 30 (o interception valve), comprising:

a fluid inlet 31;

a fluid outlet 32;

a passage duct 33, which is extended between the fluid inlet 31 and the fluid outlet 32 and is intended to be traversed by the fluid intercepted by the two-way zone valve 30 and circulating from the inlet to the fluid outlet.

The two-way zone valve 30 is configured for allowing the circulation of a flow of fluid through the passage duct 33 equal to a specific flow rate value selectable for the zone valve.

The apparatus 1 is configured for being installed in accordance with a plurality of installation modes (or configurations).

In each of such installation modes, the following technical characteristics can be encountered:

the differential pressure regulator 2 is placeable so as to intercept the delivery circuit M or the return circuit R, and the internal duct 5 is thus traversed by the fluid circulating—respectively—in the delivery circuit M or in the return circuit R;

the two-way zone valve 30 is also placeable so as to intercept the delivery circuit M or the return circuit R; the passage duct 33 can thus be traversed by the fluid circulating—respectively—in the delivery circuit M or in the return circuit R;

regardless of the installation mode, the three-way selection valve 10 is always intended to be operatively interposed between the delivery circuit M and the return circuit R;

the first inlet/outlet terminal 11 is intended to be placed in fluid communication with the high-pressure inlet 3 or with the low-pressure inlet 4 of the differential pressure regulator 2;

the second inlet/outlet terminal 12 is intended to be placed in fluid communication with a point of the delivery circuit M or of the return circuit R;

the third inlet/outlet terminal 13 is intended to be placed in fluid communication with a respective point of the return circuit R, if the second inlet/outlet terminal 12 is in fluid communication with the delivery circuit M, or of the delivery circuit M, if the second inlet/outlet terminal 12 is in fluid communication with the return circuit R.

Preferably, in accordance with a first installation mode of the apparatus:

the differential pressure regulator 2 is placed so as to intercept the delivery circuit M or the return circuit R;

the two-way zone valve 30 is placed in a point downstream with respect to the differential pressure regulator 2 along the circulation sense of the fluid in the plant, intercepting the delivery circuit M or the return circuit R.

The first installation mode of the apparatus, as will be illustrated hereinbelow, is shown in FIGS. 1-2, 5-6, 9-10.

Alternatively, in accordance with a second installation mode of the apparatus:

the differential pressure regulator 2 is placed so as to intercept the delivery circuit M or the return circuit R;

the two-way zone valve 30 is placed in a point upstream with respect to the pressure regulator 2 along the circulation sense of the fluid in the plant, intercepting the delivery circuit M or the return circuit R.

The second installation mode of the apparatus, as will be illustrated hereinbelow, is shown in FIGS. 3-4, 7-8, 11-12.

The aforesaid first and second installation mode of the apparatus 1 according to the present invention can, in addition, be implemented in a series of different configurations, all having in common the base elements introduced above (i.e. differential pressure regulator 2, three-way selection valve 10 and two-way zone valve 30), and separate from each other due to the different mutual positioning of the elements, as well as for the positioning of the same with respect to the delivery M and return R circuits.

In more detail, shown in the figures—as a non-limiting example—are six possible configurations of the apparatus, which in turn fall within the first or the second installation mode: three configurations (the first, the third and the fifth) are possible implementations of the first installation mode, while three configurations (the second, the fourth and the sixth) are possible implementations of the second installation mode.

The first installation mode can be attained in accordance with a first configuration (FIGS. 1 and 2), in which:

the differential pressure regulator 2 and the two-way zone valve 30 are both placed along the delivery circuit M;

the high-pressure inlet 3 of the differential pressure regulator 2 is fluidly connected with the delivery circuit M, at a first connection point P1 placed downstream, along the circulation sense of the fluid in the plant, with respect to the position of the differential pressure regulator 2 (and upstream of the position of the two-way zone valve 30);

the low-pressure inlet 4 of the differential pressure regulator 2 is fluidly connected with the first inlet/outlet terminal 11 of the three-way selection valve 10;

the second inlet/outlet terminal 12 of the three-way selection valve 10 is fluidly connected with the delivery circuit M, at a second connection point P2 placed downstream with respect to the position of the two-way zone valve 30;

the third inlet/outlet terminal 13 of the three-way selection valve 10 is fluidly connected with the return circuit R, at a third connection point P3.

The second installation mode can be attained in accordance with a second configuration (FIGS. 3 and 4), in which:

the differential pressure regulator 2 and the two-way zone valve (30) are both placed along the return circuit R;

the low-pressure inlet 4 of the differential pressure regulator 2 is fluidly connected with the return circuit R, at a first connection point P1' placed upstream, along the circulation sense of the fluid in the plant, with respect to the position of the differential pressure regulator 2;

the high-pressure inlet 3 of the differential pressure regulator 2 is fluidly connected with the first inlet/outlet terminal 11 of the three-way selection valve 10;

the second inlet/outlet terminal 12 of the three-way selection valve 10 is fluidly connected with the return circuit R, at a second connection point P2' placed upstream with respect to the position of the two-way zone valve 30;

the third inlet/outlet terminal 13 of the three-way selection valve 10 is fluidly connected with the delivery circuit M, at a third connection point P3'.

The first installation mode can be attained in accordance with a third configuration (FIGS. 5 and 6), in which:

the differential pressure regulator 2 is placed along the delivery circuit M;

the two-way zone valve 30 is placed along the return circuit R;

the low-pressure inlet 4 of the differential pressure regulator 2 is fluidly connected with the return circuit R, at a first connection point P1 placed downstream, along the circulation sense of the fluid in the plant, with respect to the position of the two-way zone valve 30;

the high-pressure inlet 3 of the differential pressure regulator 2 is fluidly connected with the first inlet/outlet terminal 11 of the three-way selection valve 10;

the second inlet/outlet terminal 12 of the three-way selection valve 10 is fluidly connected with the return circuit R, at a second connection point P2 placed upstream with respect to the position of the two-way zone valve 30;

the third inlet/outlet terminal 13 of the three-way selection valve 10 is fluidly connected with the delivery circuit M, at a third connection point P3.

The second installation mode can be attained in accordance with a fourth configuration (FIGS. 7 and 8), in which:

the differential pressure regulator 2 is placed along the return circuit R;

the two-way zone valve 30 is placed along the delivery circuit M;

the high-pressure inlet 3 of the differential pressure regulator 2 is fluidly connected with the delivery circuit M, at a first connection point P1' placed upstream, along the circulation sense of the fluid in the plant, with respect to the position of the two-way zone valve 30;

the low-pressure inlet 4 of the differential pressure regulator 2 is fluidly connected with the first inlet/outlet terminal 11 of the three-way selection valve 10;

the second inlet/outlet terminal 12 of the three-way selection valve 10 is fluidly connected with the delivery circuit M, at a second connection point P2' placed downstream with respect to the position of the two-way zone valve 30;

the third inlet/outlet terminal 13 of the three-way selection valve 10 is fluidly connected with the return circuit R, at a third connection point P3'.

The first installation mode can be attained in accordance with a fifth configuration (FIGS. 9 and 10), in which:

the differential pressure regulator 2 and the two-way zone valve 30 are both placed along the return circuit R;

the low-pressure inlet 4 of the differential pressure regulator 2 is fluidly connected with the return circuit R, at a first connection point P1 placed downstream, along the circulation sense of the fluid in the plant, with respect to the position of the two-way zone valve 30;

the high-pressure inlet 3 of the differential pressure regulator 2 is fluidly connected with the first inlet/outlet terminal 11 of the three-way selection valve 10;

the second inlet/outlet terminal 12 of the three-way selection valve 10 is fluidly connected with the return circuit R, at a second connection point P2 placed upstream with respect to the position of the two-way zone valve 30;

the third inlet/outlet terminal 13 of the three-way selection valve 10 is fluidly connected with the delivery circuit M, at a third connection point P3.

The second installation mode can be attained in accordance with a sixth configuration (FIGS. 11 and 12), in which:

the differential pressure regulator 2 and the two-way zone valve 30 are both placed along the delivery circuit M;

the high-pressure inlet 3 of the differential pressure regulator 2 is fluidly connected with the delivery circuit M, at a first connection point P1' placed upstream, along the circulation sense of the fluid in the plant, with respect to the position of the two-way zone valve 30;

the low-pressure inlet 4 of the differential pressure regulator 2 is fluidly connected with the first inlet/outlet terminal 11 of the three-way selection valve 10;

the second inlet/outlet terminal 12 of the three-way selection valve 10 is fluidly connected with the delivery circuit M, at a second connection point P2' placed downstream with respect to the position of the two-way zone valve 30;

the third inlet/outlet terminal 13 of the three-way selection valve 10 is fluidly connected with the return circuit R, at a third connection point P3'.

The apparatus of the present invention can operate correctly, and in the same manner, both in the first and in the second installation mode, and in particular in each of the six above-described configurations. The selection between the first and the second mode—and the selection, for these, of a specific configuration from among the six described configuration—can be carried out by the designer or installer, based on the plant type, on the shape of the delivery and return circuits, on the available spaces, etc.

The apparatus 1 is structured for selectively operating at least between a first operating mode and a second operating mode, selectively selectable by means of the positioning of the three-way selection valve 10, respectively in the first operating position and in the second operating position.

In the first operating mode:

one between the high-pressure inlet 3 and the low-pressure inlet 4 of the differential pressure regulator 2 (based on how the installation was carried out) detects the pressure of the fluid coming from the first connection point P1 or P1';

conversely, the other between the low-pressure inlet 4 and the high-pressure inlet 3 of the differential pressure regulator 2 detects the pressure of the fluid coming from the second connection point P2 or P2', so that the three-way selection valve 10 is in the first operating position and allows the communication (i.e. the passage) of fluid between the first 11 and the second inlet/outlet terminal 12 (with the first inlet/outlet terminal 11 connected to the inlet at low or high pressure and the second inlet/outlet terminal 12 connected to the second connection point);

the third inlet/outlet terminal 13 of the three-way selection valve 10 is closed.

In such a manner, the pressure difference between the second connection point P2 or P2' and the first connection point P1 or P1' is maintained constant (in absolute value), i.e. at the ends of the two-way zone valve 30.

It is observed that the first operating mode of the apparatus 1 (three-way selection valve 10 in the first operating position) is schematically illustrated in FIGS. 1, 3, 5, 7, 9 and 11, for the apparatus attained respectively according to the first, the second, the third, the fourth, the fifth and the sixth configuration. The third inlet/outlet terminal 13 of the three-way selection valve 10 is indicated in dark color since it is closed.

Figure 3:
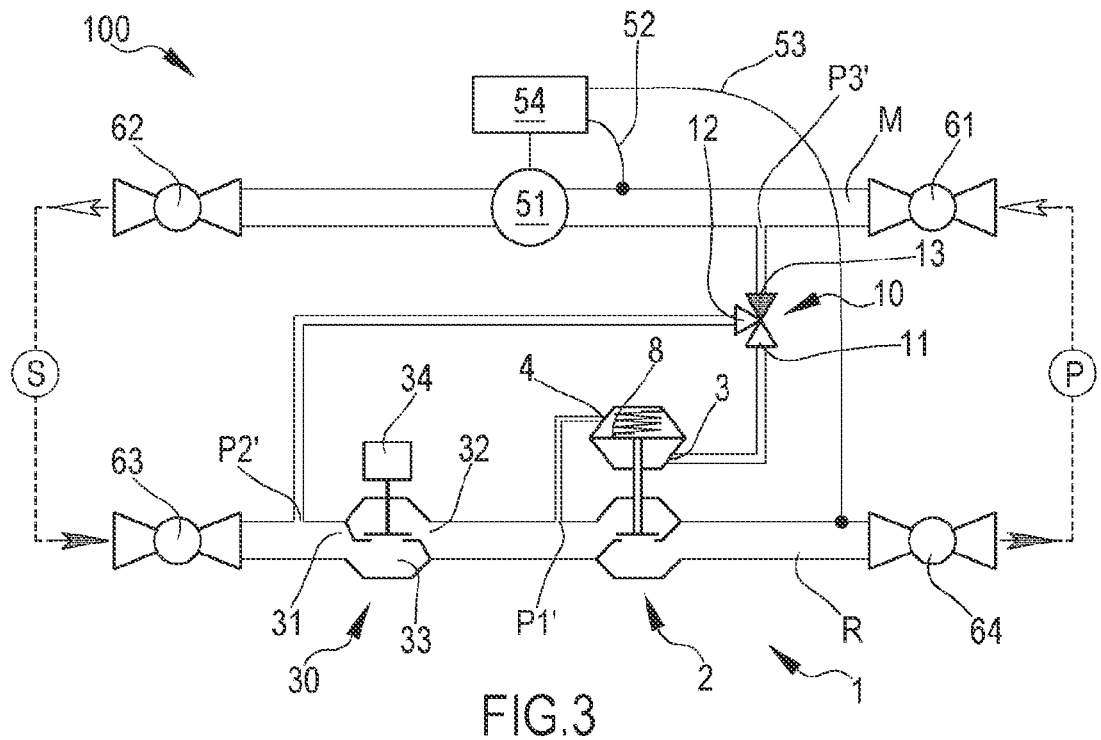
FIG. 3 shows a schematic representation of a regulation apparatus for thermal plants according to the present invention, installed at the ends of a secondary side of a thermal plant, in accordance with a second exemplifying embodiment and operating in a first operating mode.
Figure 5:
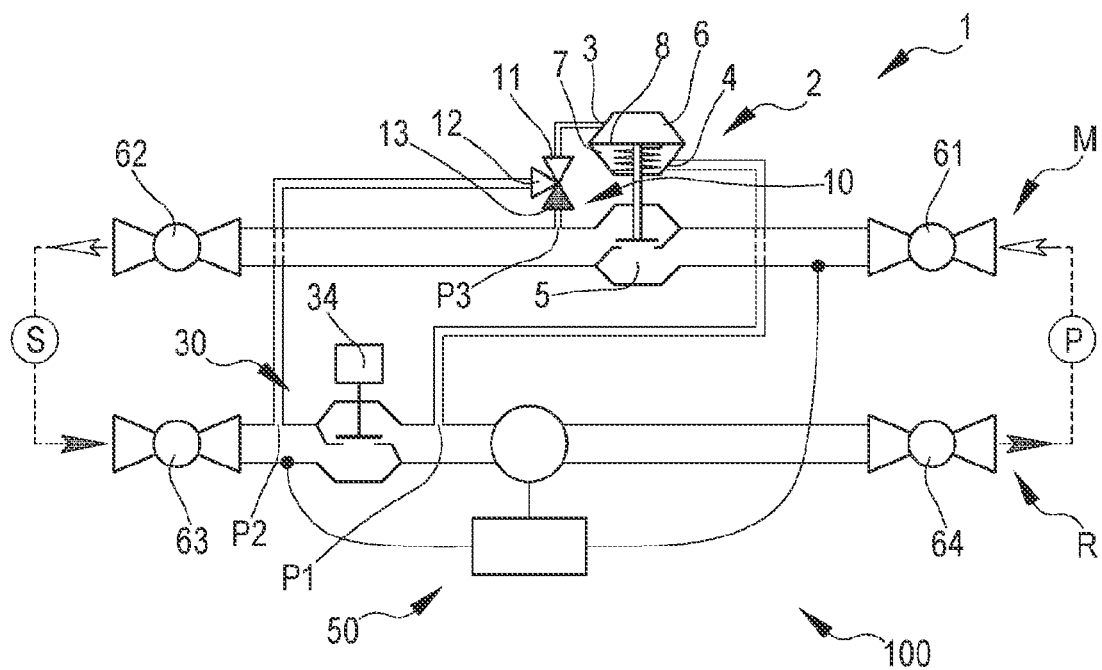
FIG. 5 shows a schematic representation of a regulation apparatus for thermal plants according to the present invention, in accordance with a third exemplifying embodiment and operating in a first operating mode.
Figure 7:
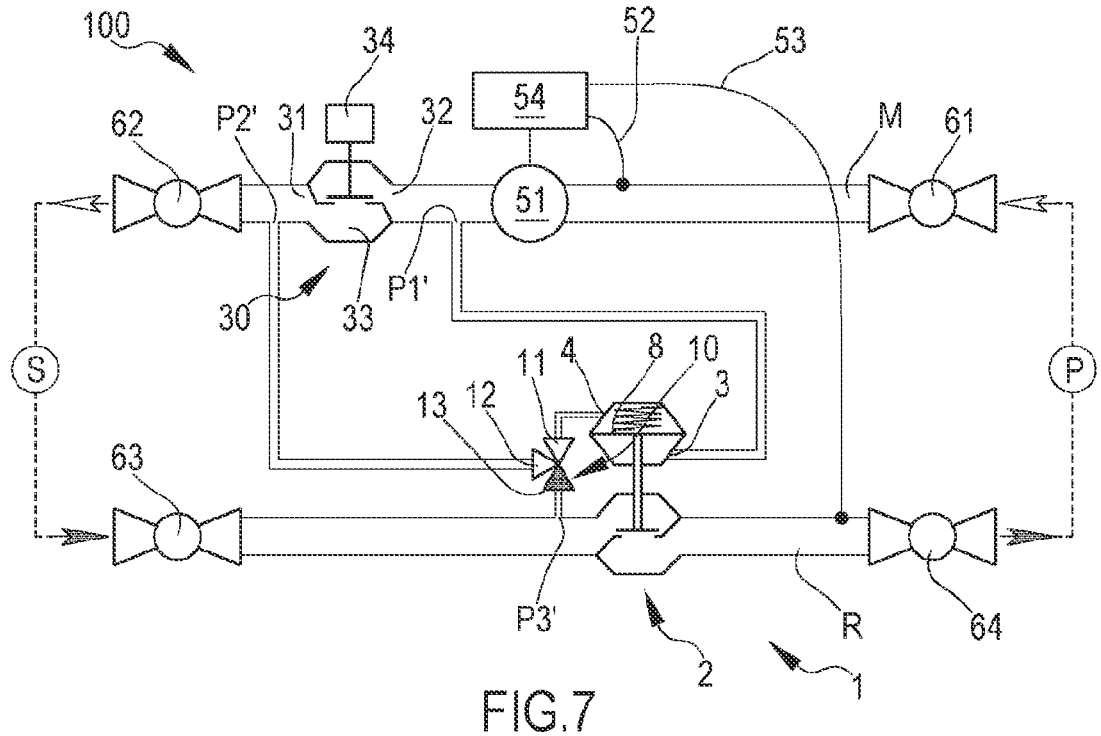
FIG. 7 shows a schematic representation of a regulation apparatus for thermal plants according to the present invention, in accordance with a fourth exemplifying embodiment and operating in a first operating mode.
Figure 9:
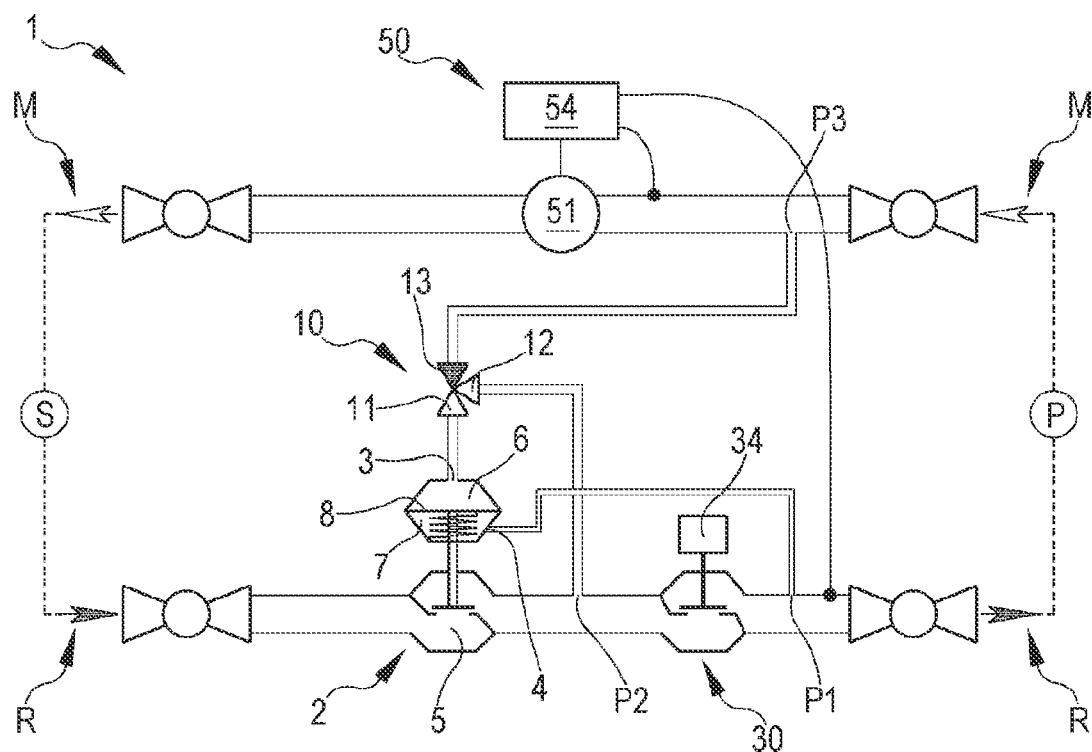
FIG. 9 shows a schematic representation of a regulation apparatus for thermal plants according to the present invention, in accordance with a fifth exemplifying embodiment and operating in a first operating mode.
Figure 11:
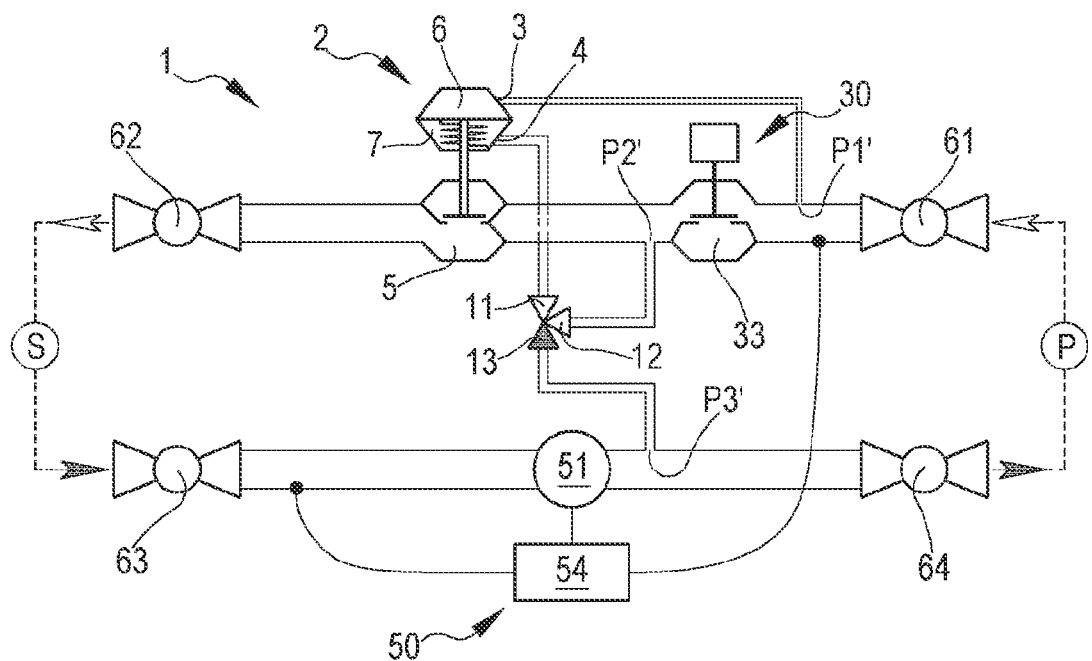
FIG. 11 shows a schematic representation of a regulation apparatus for thermal plants according to the present invention, in accordance with a sixth exemplifying embodiment and operating in a first operating mode.

In addition, in the configurations of FIGS. 1, 5 and 9 (first installation mode) it is observed that the pressure difference (maintained constant) to be considered is P1-P2, while in the configurations of FIGS. 3, 7 and 11 (second installation mode) the pressure difference (maintained constant) to be considered is P2'-P1'. It is observed that, in the aforesaid configurations of FIGS. 1, 5 and 9 and of FIGS. 3, 7 and 11 the "pressure difference" is to be considered in absolute value, i.e. respectively |P1-P2| and |P2'-P1'|. The apparatus 1, in the first operating mode, overall attains a dynamic balancing independent of the pressure and at constant flow rate towards the secondary side, where such flow rate is selectable through the two-way zone valve.

In the second operating mode:
one between the high-pressure inlet 3 and the low-pressure inlet 4 of the differential pressure regulator 2 (based on how the installation was carried out) detects the pressure of the fluid coming from the first connection point P1 or P1';
conversely, the other between the low-pressure inlet 4 and the high-pressure inlet 3 of the differential pressure regulator 2 (based on how the installation was carried out) detects the pressure of the fluid coming from the third connection point P3 or P3', so that the three-way selection valve 10 is in the second operating position and allows the communication (i.e. the passage) of fluid between the first 11 and the third inlet/outlet terminal 13 (with the first inlet/outlet terminal 11 connected to the low-pressure or high-pressure inlet and the third inlet/outlet terminal 13 connected to the third connection point);
the second inlet/outlet terminal 12 of the three-way selection valve 10 is closed.

In such a manner, the pressure difference between the third connection point P3 or P3' and the first connection point P1 or P1' is maintained constant (in absolute value), i.e. at the ends of the entire secondary side S.

It is observed that the second operating mode of the apparatus 1 (three-way selection valve 10 in the second operating position) is schematically illustrated in FIGS. 2, 4, 6, 8, 10 and 12, for the apparatus attained respectively according to the first, the second, the third, the fourth, the fifth and the sixth configuration. The second inlet/outlet terminal 12 of the three-way selection valve 10 is indicated in dark color since it is closed.

Figure 2:
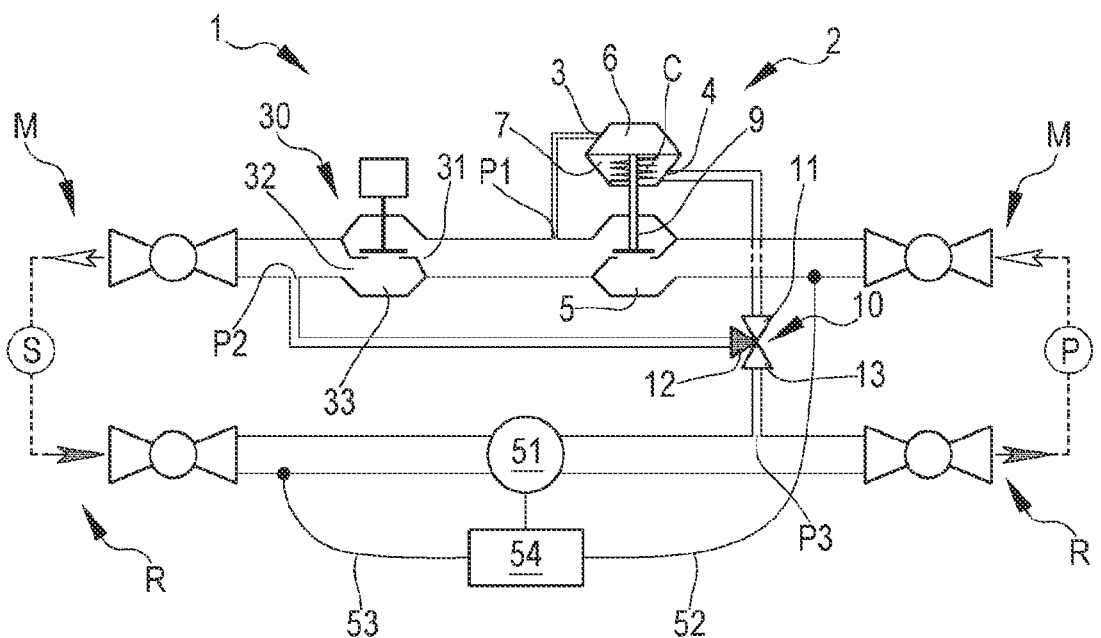
FIG. 2 shows the regulation apparatus for thermal plants of FIG. 1, operating in a second operating mode.
Figure 4:
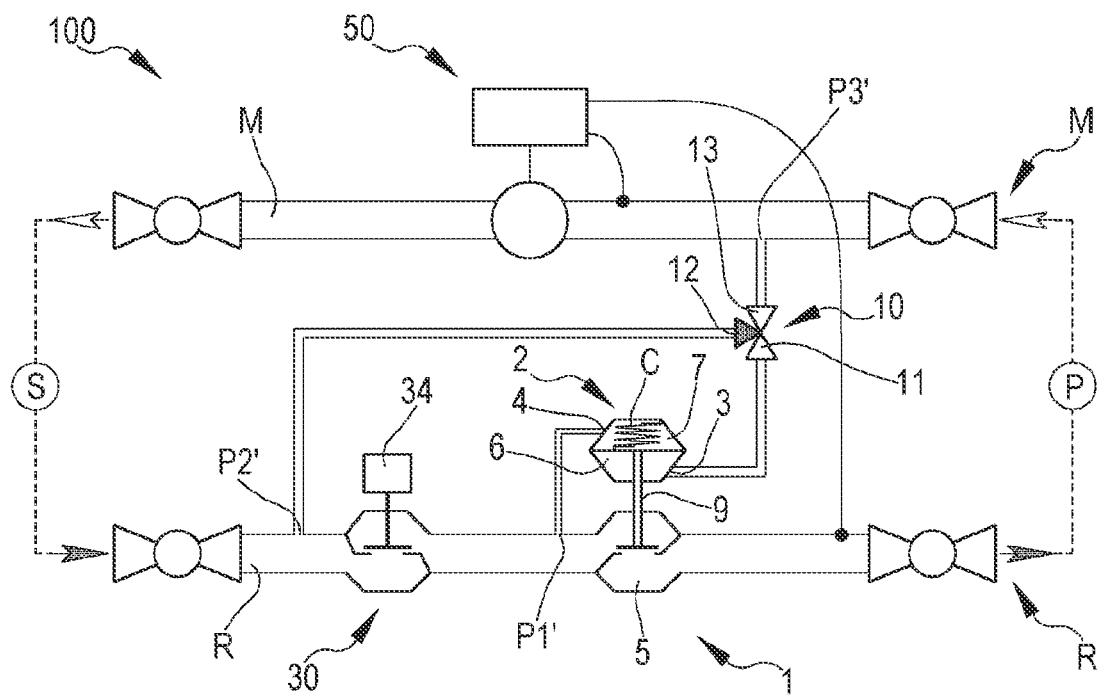
FIG. 4 shows the regulation apparatus for thermal plants of FIG. 3, operating in a second operating mode.
Figure 6:
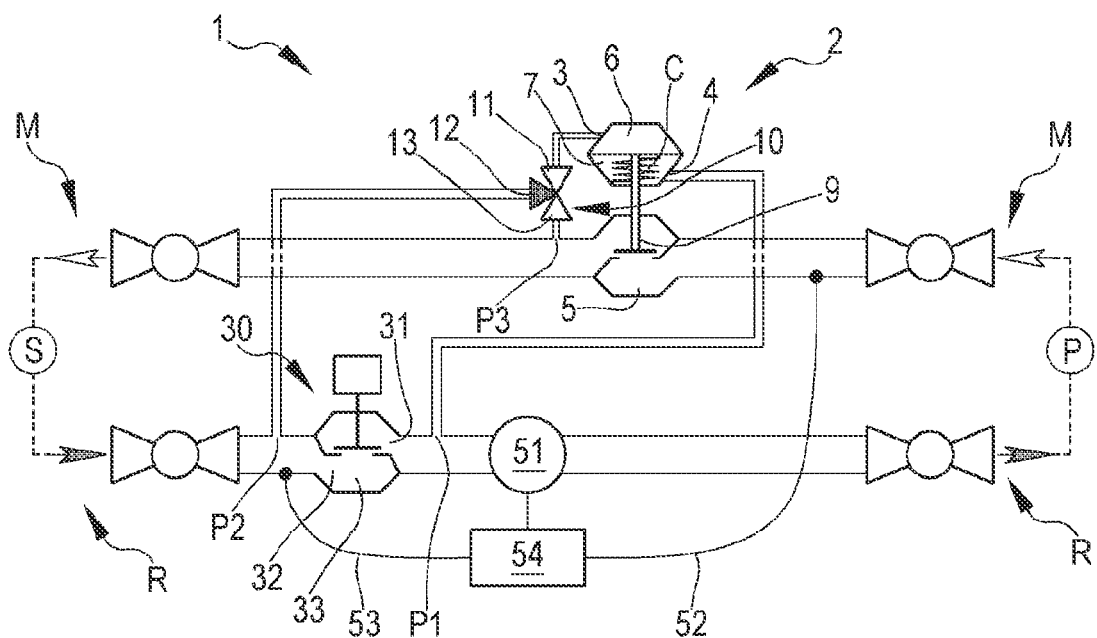
FIG. 6 shows the regulation apparatus for thermal plants of FIG. 5, operating in a second operating mode.
Figure 8:
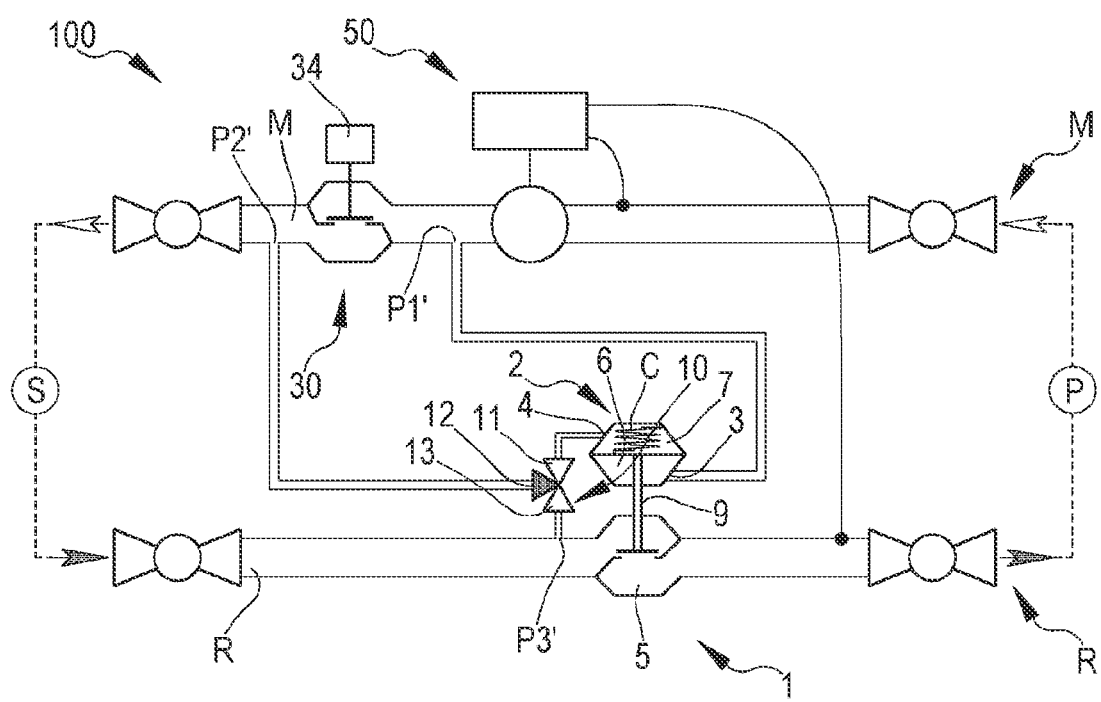
FIG. 8 shows the regulation apparatus for thermal plants of FIG. 7, operating in a second operating mode.
Figure 10:
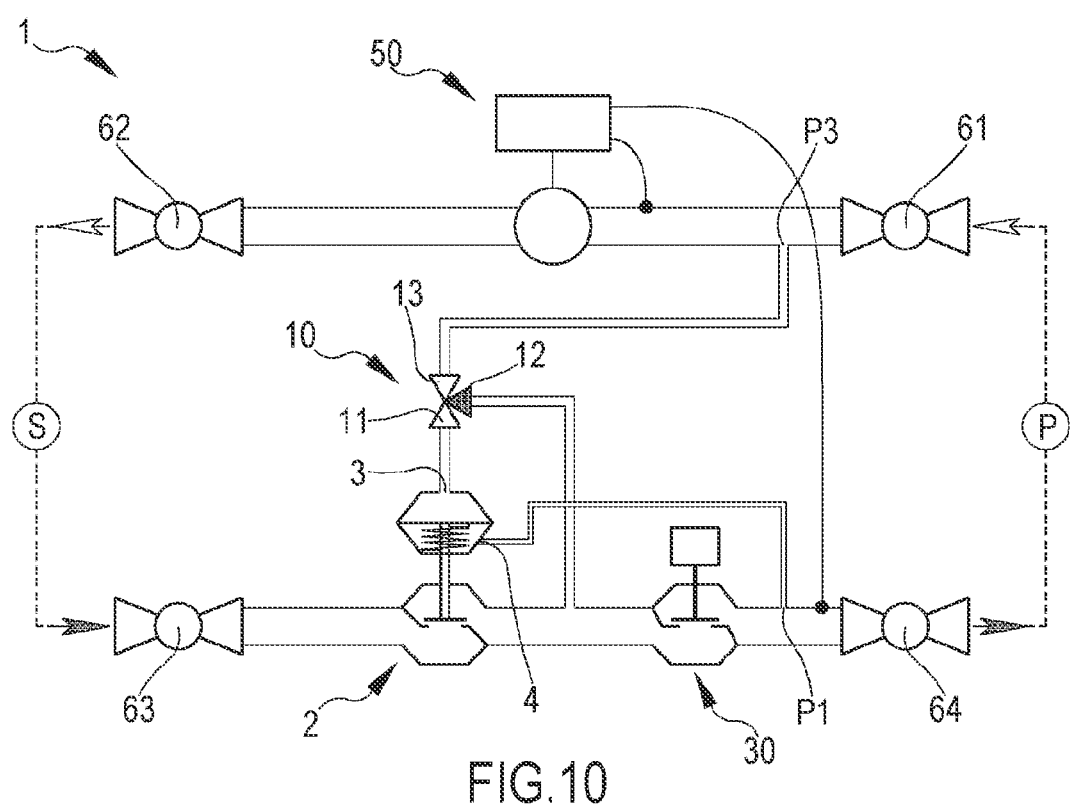
FIG. 10 shows the regulation apparatus for thermal plants of FIG. 9, operating in a second operating mode.
Figure 12:
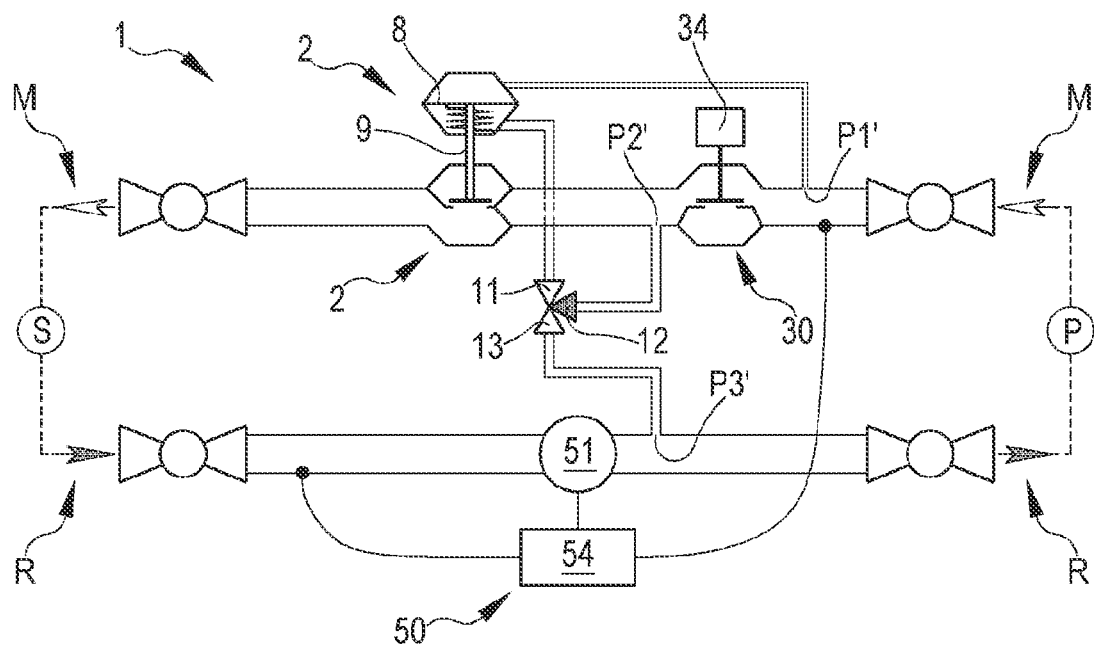
FIG. 12 shows the regulation apparatus for thermal plants of FIG. 11, operating in a second operating mode.

In addition, it is observed that in the configurations of FIGS. 2, 6 and 10 (first installation mode) the pressure difference (maintained constant) to be considered is P1-P3, while in the configurations of FIGS. 4, 8, and 12 (first installation mode) the pressure difference (maintained constant) to be considered is P3'-P1'. It is observed that, in the aforesaid configurations of FIGS. 2, 6 and 10 and of FIGS. 4, 8 and 12 the "pressure difference" is to be considered in absolute value, i.e. respectively |P1-P3| and |P3'-P1'|. The apparatus 1, in the second operating mode, overall attains a dynamic balancing with constant pressure difference and with variable flow rate.

Preferably the first operating mode and the second operating mode of the apparatus 1 are selectable, and operate in the same manner, both if the apparatus is configured according to the first installation mode, and if the apparatus is configured according to the second installation mode.

Preferably the first operating mode and the second operating mode of the apparatus are selectable, and operate in the same manner, both if the differential pressure regulator 2 and the two-way zone valve 30 are placed along the delivery circuit M, and if the differential pressure regulator 2 and the two-way zone valve 30 are placed along the return circuit R, and if the differential pressure regulator 2 and the two-way zone valve 30 are placed along different circuits (i.e. one on the delivery circuit M and the other on the return circuit R).

Preferably the two-way zone valve 30 comprises a flow rate selector 34 configured for defining, possibly by varying it over time, the aforesaid specific flow rate value circulating through the passage duct 33 of the two-way zone valve.

The two-way zone valve 30 can comprise an actuator configured for acting on the flow rate selector 34.

The actuator can be of on/off type and be configured for opening the zone valve, with the specific flow rate value equal to an opening flow rate, or closing the zone valve with the specific flow rate value equal to zero.

Alternatively, the actuator can be configured for positioning the flow rate selector 34 in a plurality of discrete positions, each of which corresponding to a respective specific flow rate value.

The actuator can be configured for continuously moving the flow rate selector 34, in a manner such to be able to continuously modulate the specific flow rate value within an interval of attainable flow rate values.

It is observed that in the figures the zone valve is schematically represented, as an example, as a piston valve, however in an equivalent manner a structurally different valve could be present, for example a ball valve or a rotary valve.

The two-way zone valve 30 can be configured for being delivered by a control unit, e.g. a control unit of the thermal plant or a processing unit, in a manner such to receive a command signal configured for establishing, over time, the specific flow rate value of the valve.

In such case the two-way zone valve can be delivered by a control logic, e.g. a time-flow rate curve or a set of time-flow rate value pairs.

In one possible embodiment, the two-way zone valve is manually controllable, for example by means of a knob, acting on the flow rate selector in order to define the specific flow rate value.

The two-way zone valve can comprise a selection ring nut (acting as flow rate selector) provided with suitable holes of different diameter, for selecting the maximum desired flow rate (preselection of the maximum flow rate value).

In one possible embodiment, if the required flow rate must not be changed (and there is no need to close the zone valve), the two-way zone valve can be attained as a calibrated hole defining a specific constant operating flow rate (in such case the calibrated hole acts as flow rate selector).

Preferably the differential pressure regulator 2 comprises a body provided with the high-pressure inlet 3 and the low-pressure inlet 4, and defining at its interior:
a high-pressure chamber 6, connected to the high-pressure inlet 3; and
a low-pressure chamber 7, connected to the low-pressure inlet 4,
in which, between the high-pressure chamber 6 and the low-pressure chamber 7, a movable element 8 is placed, preferably a disc or equalizing membrane, having a high-pressure side, communicating with the high-pressure chamber 6 and on which the pressure of the fluid present in the high-pressure chamber impacts, and a low-pressure side, communicating with the low-pressure chamber 7 and on which the pressure of the fluid present in the low-pressure chamber impacts.

Preferably the movable element 8 is connected to a shutter 9 active on a passage section of the internal duct 5 of the differential pressure regulator 2, in a manner such that the position and/or the shape of the movable element 8 acts on the shutter 9 which defines the size of the passage section of the internal duct 5, and a movement or contraction (or shape variation) of the movable element 8 varies the position of the shutter 9 and hence the size of the passage section of the internal duct 5.

Preferably the differential pressure regulator 2 comprises a contrast spring C situated in the low-pressure chamber 7 and impacting on the movable element 8; the contrast spring is preferably regulatable (e.g. by means of variation of the preload) in a manner such to define a specific position of the movable element 8 as a function of the desired pressure difference value that one wishes to maintain constant between the high-pressure chamber 6 and the low-pressure chamber 7. In one possible embodiment, not shown, the differential pressure regulator can comprise a contrast spring in the high-pressure chamber (rather than in the low-pressure chamber).

Preferably the differential pressure regulator 2 is configured in a manner such that variations or fluctuations of the pressure in the high-pressure chamber 6 and/or in the low-pressure chamber 7 (caused, for example, from the opening or closing of valves in other points of the plant) cause the movement or the contraction of the movable element 8, based on the regulation of the contrast spring C, and hence the position of the shutter 9, in a manner such to restore the selected pressure difference value between high-pressure chamber and low-pressure chamber.

Preferably the differential pressure regulator 2 comprises a regulation knob, acting on the contrast spring C, for selecting the desired pressure difference value, to be maintained constant, between the high-pressure chamber 6 and the low-pressure chamber 7.

The differential pressure regulator can comprise an actuator, possibly remote-controllable, e.g. from a control unit, configured for defining the desired pressure difference value, to be maintained constant, between the high-pressure chamber 6 and the low-pressure chamber 7.

In one possible embodiment, one between the low-pressure chamber 7 and the high-pressure chamber 6 of the differential pressure regulator can be directly communicating with the internal duct 5 of the regulator itself, in which the fluid that flows through the regulator circulates, i.e. such chamber can be supplied directly from the fluid that traverses the regulator 2. In such case the pressure present in the chamber communicating directly with the internal duct 5, and impacting one side of the movable element 8, corresponds with the pressure of the fluid that circulates in the circuit (delivery M or return R) intercepted by the differential pressure regulator.

Preferably the three-way selection valve 10 comprises a body provided with the first inlet/outlet terminal 11, of the second inlet/outlet terminal 12 and of the third inlet/outlet terminal 13, and defining at its interior a communication chamber between the three inlets/outlets in which a movable shutter is housed which is configured for selectively placing in fluid communication:

the first inlet/outlet terminal 11 with the second inlet/outlet terminal 12, simultaneously closing the third inlet/outlet terminal 13, when the first operating position of the valve is selected, or the first inlet/outlet terminal 11 with the third inlet/outlet terminal 13, simultaneously closing the second inlet/outlet terminal 12, when the second operating position is selected.

The movable shutter of the three-way selection valve can be a ball shutter housed in the communication chamber, or a piston element.

The three-way selection valve 10 can comprise a drive member, e.g. a lever or a knob, acting on the movable shutter in order to select the first operating position or the second operating position.

The three-way selection valve can comprise an actuator, for example a motorized actuator, acting on the shutter in order to select, preferably remotely, e.g. by means of a command sent by a control unit, the first operating position or the second operating position.

Preferably, with the apparatus in the first operating mode (FIGS. 1, 3, 5, 7, 9, 11):

the two-way zone valve 30, configured for selecting a specific flow of fluid passing through this, with a geometry fixed for the fluid circulating in the secondary side S;

the differential pressure regulator 2 maintains constant the pressure difference (in absolute value) at the ends, i.e. between upstream and downstream, of the two-way zone valve 30, i.e. between second connection point P2 (or P2') and first connection point P1 (or P1'); it is observed that in the configuration of FIG. 1, the pressure difference (maintained constant) is P1-P2, in the configuration of FIG. 3 the pressure difference (maintained constant) is P2'-P1', in the configurations of FIGS. 5 and 9 the pressure difference (maintained constant) is P2-P1, in the configurations of FIGS. 7 and 11 the pressure difference (maintained constant) is P1'-P2';

in this manner, by means of the selection operated with the two-way zone valve 30 and the action of the differential pressure regulator 2 for maintaining the constant pressure difference, one obtains a constant flow rate on the secondary side S with the aforesaid fixed geometry.

The two-way zone valve can be configured for modulating, based on a setting command, the specific flow rate value of fluid passing through this, and such modulation determines a variation of the hydraulic geometry in the secondary side, on which the pressure difference impacts at the ends of the two-way zone valve, i.e. between second connection point and first connection point. In such a manner, also by varying the flow rate established by the two-way zone valve 30 (i.e. varying the set-point defined by the two-way zone valve), the differential pressure regulator 2 continues to maintain constant the pressure difference at the ends of the two-way zone valve, compensating for possible fluctuations of pressure introduced in other points of the plant, and in this manner the aforesaid flow rate established in the secondary side S is maintained constant.

Preferably, the apparatus 1 in the first operating mode operates in a manner such that:

the two-way zone valve 30 sets the desired flow rate value for the secondary side S (i.e. fixes the geometry);

the differential pressure regulator 2 acts in a manner such that such desired flow rate value is actually that set (maintaining constant the pressure difference at the ends of the two-way zone valve).

Preferably, with the apparatus 1 in the first operating mode, the desired flow rate value is constant, i.e. once set by means of the two-way zone valve 30, it is maintained due to the differential pressure regulator 2, but modifiable—over time—since the two-way zone valve 30 allows setting different flow rate values. In other words it is possible to vary the desired flow rate value, but when such value is reached, it is maintained constant. In substance, one can speak of operating at "settable and modulatable constant flow rate".

In one aspect, with the apparatus in the second operating mode (FIGS. 2, 4, 6, 8, 10, 12):

the differential pressure regulator 2 works between the two ends of the secondary side S, maintaining a constant pressure difference between delivery M and return R;

in this case the two-way zone valve 30 becomes equivalent to a loss in series, on the delivery (FIGS. 2, 8, 12) or on the return (FIGS. 4, 6, 10) based on the configuration of installation of the apparatus.

In such case the two-way zone valve 30 can be employed, if necessary, as interception valve of the branch on which it is installed.

In summary:

in the first operating mode the apparatus 1 maintains constant the pressure difference at the ends of the two-way zone valve 30 (PICV operation);

in the second operating mode the apparatus 1 maintains constant the pressure difference at the ends of the secondary side S on which it is installed, i.e. between delivery and return, at the ends of the apparatus itself (DPCV operation).

Hereinbelow, the operation of the technical solution at the base of the present invention is analyzed in more detail. The apparatus is inserted upstream of a secondary side (e.g. an apartment) for the purpose of controlling the heat carrier fluid coming from the centralized boiler. The two-way zone valve 30 is opened if there is a request for heating (or, analogously, cooling) by the apartment downstream, and vice versa the zone valve remains closed if there is no request. The apparatus is characterized in that it attains, by means of its components, a dynamic balancing with selectable mode.

As illustrated above, the differential pressure regulator 2 can be a membrane device with contrast spring (possibly also of known type or by catalogue), which as a function of the pressure difference applied on the two sides (surfaces) of the membrane, opens and closes a shutter so as to maintain constant the differential pressure between two points of a circuit.

Due to the three-way selection valve 10, it is possible to select which are the two points, i.e. vary the position of these two points between which the pressure difference is maintained constant by the differential pressure regulator.

In the FIG. 1 (first installation mode, first configuration) the differential pressure regulator 2 maintains constant the pressure difference between P1 and P2 (i.e. P1-P2=constant). Thus, one obtains that at the ends of the two-way zone valve the pressure difference is maintained constant and hence the subset constituted by the differential pressure regulator and by the two-way zone valve (components 2+30) acts as a regulator independent of the differential pressure or PICV (Pressure Independent Control Valve). Independent of the fluctuations of pressure upstream and downstream, the flow rate that circulates through the two-way zone valve—and hence through the entire apparatus—is always constant. The flow rate value will be a function—instant by instant—of the position selected for the flow rate selector of the two-way zone valve, as well as of the open position taken on by the shutter of such valve.

It is observed that, with P1-P2=constant, the apparatus can still modulate the flow rate up to a maximum value defined by the position of the selector and/or by the complete opening of the shutter of the two-way zone valve.

The first operating mode, with constant flow rate, can be indicated for plants with terminals that require constant flows such as fan coil units, injection circuits, etc.

In the FIG. 2 (first installation mode, first configuration) the apparatus operates in the second operating mode: the passage from the condition of FIG. 1 to the condition of FIG. 2 is obtained by modifying the position of the three-way selection valve 10. In such case the differential pressure regulator maintains constant the pressure difference between P1 and P3 (i.e. P1-P3=constant). Thus one obtains a constant pressure difference at the ends of the entire apparatus (or "module") and hence at the ends of the secondary side (for example an apartment). In this case, the differential pressure regulator carries out a function of DPCV (differential pressure control valve) type. Such second operating mode is adapted for secondary sides (e.g. apartments) having variable flow rate devices at their interior, such as thermostatic valves or manifolds with multiple zones for radiant plants.

FIGS. 3 and 4 show the apparatus 1 in one possible embodiment (which corresponds with the aforesaid second installation mode and second configuration, with differential pressure regulator and two-way zone valve on the return circuit R). The operation of the apparatus according to such installation is analogous to that described with reference to the first installation mode: in substance the apparatus of FIG. 3 (first operating mode) operates analogous to the apparatus as in FIG. 1, while the apparatus of FIG. 4 (second operating mode) operates analogous to the apparatus as in FIG. 2.

In the case shown in FIG. 3, the pressure difference P2'-P1' (i.e. P2'-P1'=constant) is maintained constant at the ends of the two-way zone valve, and hence the apparatus works in "pressure independent" mode, with constant flow rate.

In the case shown in FIG. 4, however, the pressure is maintained constant at the ends of the entire apparatus or "module", i.e. between the points P3' and P1' (hence P3'-P1'=constant), and hence the apparatus operates a constant pressure difference, with variable flow rate.

In FIGS. 1 and 3 (first operating mode), the pressure difference is maintained constant (in absolute value) between the first connection point (P1; P1') and the second connection point (P2; P2'). Specifically, in the configuration of FIG. 1 the constant pressure difference is P1-P2, while in the configuration of FIG. 3 the constant pressure difference is P2'-P1'.

In FIGS. 2 and 4 (second operating mode), the pressure difference is maintained constant (in absolute value) between the first connection point (P1; P1') and the third connection point (P3; P3'). Specifically, in the configuration of FIG. 2 the constant pressure difference is P1-P3, while in the configuration of FIG. 4 the constant pressure difference is P3'-P1'.

In accordance with further possible equivalent embodiments of the present invention, shown in FIGS. 5-6 (third configuration) and in FIGS. 7-8 (fourth configuration), the differential pressure regulator 2 and the two-way zone valve 30 can be placed on two distinct circuits (not necessarily on the same circuit), i.e. one on the delivery circuit M and the other on the return circuit R.

A further possible equivalent embodiment of the present invention is shown in FIGS. 9-10 (fifth configuration): in such case the differential pressure regulator 2 and the two-way zone valve 30 are placed on the same circuit, i.e. the return circuit R, but in "reversed" positions with respect to the second configuration (FIGS. 3 and 4).

A further possible equivalent embodiment of the present invention is shown in FIGS. 11-12 (sixth configuration): in such case the differential pressure regulator 2 and the two-way zone valve 30 are placed on the same circuit, i.e. the delivery circuit M, but in "reversed" positions with respect to the first configuration (FIGS. 1 and 2).

It is observed that the present invention can be implemented according to each of the six exemplifying embodiments shown in the FIGS. 1-2; 3-4; 5-6; 7-8; 9-10; 11-12), which attain—by means of different but functionally equivalent schemes—the apparatus in accordance with the first or the second installation mode: all such embodiments can operate selectively in the first operating mode or in the second operating mode.

The six embodiments differ due to the positioning of the differential pressure regulator 2 and of the two-way zone valve 30 (both mutual positioning and with respect to the delivery and return circuits), specifically:
- first embodiment (FIGS. 1-2): differential pressure regulator and two-way zone valve on the delivery circuit, with two-way zone valve downstream of the differential pressure regulator;
- second embodiment (FIGS. 3-4): differential pressure regulator and two-way zone valve on the return circuit, with two-way zone valve upstream of the differential pressure regulator;
- third embodiment (FIGS. 5-6): differential pressure regulator on the delivery circuit and two-way zone valve on the return circuit (hence two-way zone valve downstream of the differential pressure regulator);
- fourth embodiment (FIGS. 7-8): differential pressure regulator on the return circuit and two-way zone valve on the delivery circuit (hence two-way zone valve upstream of the differential pressure regulator);
- fifth embodiment (FIGS. 9-10): differential pressure regulator and two-way zone valve on the return circuit, with two-way zone valve downstream of the differential pressure regulator;
- sixth embodiment (FIGS. 11-12): differential pressure regulator and two-way zone valve on the delivery circuit, with two-way zone valve upstream of the differential pressure regulator.

In all cases, the three-way selection valve 10 is interposed between delivery circuit M and return circuit R.

In one possible embodiment, the apparatus 1 can comprise a heat counter (or meter) 50 comprising:
- a volumetric counter 51, installed on the delivery circuit M or on the return circuit R, configured for measuring the quantity, or the flow rate, of fluid circulating in the circuit along which it is installed;
- a delivery probe 52, placed at a point of the delivery circuit M and configured for detecting, over time, the temperature of the fluid circulating in the delivery circuit;
- a return probe 53, placed at a point of the return circuit R and configured for detecting, over time, the temperature of the fluid circulating in the return circuit;
- a calculation unit 54 of the heat counter 50, in communication with the volumetric counter 51, with the delivery probe 52 and with the return probe 53, in a manner such to receive:
  - an instantaneous flow rate value measured by the volumetric counter;
  - a delivery temperature value measured by the delivery probe;
  - a return temperature value measured by the return probe.

Preferably the calculation unit 54 of the heat counter 50 is configured for calculating the heat consumption, or energy consumption, associated—in a specific time interval—with the plant portion 100 served by the apparatus 1, i.e. downstream thereof, and in particular to the secondary side S on which the apparatus is installed 1.

In one aspect the calculation unit of the heat counter is configured for receiving the instantaneous flow rate value, the delivery temperature value and the return temperature value at specific discrete time intervals.

Preferably the calculation unit 54 of the heat counter 50 is configured for calculating an instantaneous power or a heat consumption/energy associated with a specific operating time interval of the plant 100.

Preferably, the calculation unit 54 of the heat counter 50 is in communication with the volumetric counter 51, with the delivery probe 52 and with the return probe 53 by means of respective wired connections and/or by means of remote connections, e.g. of wireless or radio type.

The apparatus, when it comprises the heat counter 50, is configured—in addition for carrying out a function of balancing of the plant—also for executing a function of metering consumptions.

Typically the volumetric counter is installed on the return circuit.

In each case, the volumetric counter 51 can be installed on the circuit—between delivery M and return R—opposite that on which the differential pressure regulator 2 and the two-way zone valve 30 are installed.

In other words, in the configurations of the apparatus with differential pressure regulator 2 and two-way zone valve 30 on the delivery circuit M, the volumetric counter 51 is preferably installed on the return circuit R, while in the configurations of the apparatus with differential pressure regulator 2 and two-way zone valve 30 on the return circuit R, the volumetric counter 51 is preferably installed on the delivery circuit M.

Thus, the installation of the volumetric counter 51 is more facilitated, being placed on the circuit free of the bulk of the differential pressure regulator and of the two-way zone valve.

In any case, the volumetric counter 51 can still be installed on the same circuit—between delivery M and return R—on which also the differential pressure regulator and the two-way zone valve are installed.

As an example, the volumetric counter 51 can be installed:
- if along the return circuit R, in a position upstream of the third connection point P3, which is fluidly connected with the third inlet/outlet terminal 13 of the three-way selection valve 10;
- if along the delivery circuit M, in a position downstream of the third connection point P3', which is fluidly connected with the third inlet/outlet terminal 13 of the three-way selection valve 10.

Thus the volumetric counter is taken under consideration, from a hydraulic standpoint, in the balancing of the plant executed by the apparatus, in particular by the differential pressure regulator and by the two-way zone valve.

Preferably the heat counter 50 is configured for communicating with a control unit of the plant, in order to send data thereto and/or to receive data and/or commands therefrom.

Preferably the heat counter 50 comprises a display configured for displaying information relative to the metering, e.g. the heat consumption associated with the secondary side S downstream of the apparatus.

The heat counter can be of integrated type, i.e. be made as a body within which the volumetric counter 51, at least one temperature probe (which acts as delivery probe if the counter is placed on the delivery circuit, or as return probe if the counter is placed on the return circuit) and the calculation unit are integrated. The calculation unit (or said body) can thus be connected to second temperature probe, to be placed on the other circuit whose temperature it is desired to measure.

Preferably, as shown as an example in the figures, the apparatus 1 comprises one or more interception valves (61, 62, 63, 64) placed along the delivery circuit M and/or the return circuit R, configured for selectively opening and closing the transit of fluid at the respective installation point.

Preferably the apparatus 1, when installed in the first configuration (FIGS. 1 and 2), comprises:
- a first interception valve 61, placed on the delivery circuit M in a position upstream of the differential pressure regulator 2;
- a second interception valve 62, placed on the delivery circuit M in a respective position downstream of the two-way zone valve 30, and in particular downstream of the second connection point P2;
- a third interception valve 63, placed on the return circuit in a respective position upstream of the third connection point P3, and—if present—of the volumetric counter 51;
- a fourth interception valve 64, placed on the return circuit R in a respective position downstream of the third connection point P3, and—if present—of the volumetric counter 51.

Preferably the apparatus 1, when installed in the second configuration (FIGS. 3 and 4), comprises:
- a first interception valve 61, placed on the delivery circuit M in a respective position upstream of the third connection point P3', and—if present—of the volumetric counter 51;
- a second interception valve 62, placed on the delivery circuit M in a respective position downstream of the third connection point P3', and—if present—of the volumetric counter 51;
- a third interception valve 63, placed on the return circuit R in a respective position upstream of the two-way zone valve 30, and in particular upstream of the second connection point P2';
- a fourth interception valve 64, placed on the return circuit R in a position downstream of the differential pressure regulator 2.

In the further configurations, in an analogous manner, the interception valves 61, 62, 63 and 64 are placed, on the delivery circuit M and on the return circuit R, in external positions with respect to the elements of the apparatus 1, such to "contain them" along the travel sense of the fluid in the plant.

Preferably the first interception valve 61, the second interception valve 62, third interception valve 63 and the fourth interception valve 64 are placed in a manner such to delimit the ends of the apparatus 1, on the delivery M and return R circuits.

In other words, the section of delivery circuit between first and second interception valve, and the section of return circuit between third and fourth interception valve represent the portions of plant 100 affected by the apparatus 1, i.e. between which elements of the apparatus are present.

In one possible embodiment, the apparatus 1 is composed of a set of discrete components to be assembled, each provided with a respective body intended to be placed in a specific position of the plant 100, and in particular comprises:
- a differential pressure regulator 2;
- a three-way selection valve 10;
- a two-way zone valve 30;
- optionally, a heat counter 50;
- optionally, one or more interception valves.

In an alternative embodiment, the apparatus can be attained as a single group comprising at its interior:
- a differential pressure regulator; and/or
- a three-way selection valve; and/or
- a two-way zone valve; and/or
- optionally, a heat counter;
- optionally, one or more interception valves.

Preferably such single group is a single containment body, or module, intended to be placed in a single piece in the plant 100, in a manner such to intercept both the delivery circuit M and the return circuit R.

In such case, within the single group, all the fluid paths and the elements of the differential pressure regulator, of the three-way selection valve and of the two-way zone valve are defined.

The single group can integrate three elements, i.e. differential pressure regulator, three-way selection valve and two-way zone valve, or only two of these (and the third separated).

Preferably the apparatus 1 is configured for operating in the first operating mode when it is intended for regulating and balancing a secondary side S of the plant in which terminals are present which require constant flows, such as for example fan coil units or injection circuits.

Preferably the apparatus 1 is configured for operating in the second operating mode when it is intended for regulating and balancing a secondary side S of the plant in which terminals are present which operate with variable flows, such as for example thermostatic valves or manifolds with multiple zones for radiant plants.

Preferably the secondary side S of the plant can correspond with an apartment or a residential unit, or a portion of apartment or a group of terminals or a single terminal.

Preferably the two-way zone valve 30 is configured for being opened if there is a request for heating by one or more terminals placed downstream of the apparatus 1, in the secondary side S, setting the flow rate selector 34 at a specific flow rate value greater than zero, possibly variable over time based on a command logic and as a function of the progression of the heating request.

Preferably the two-way zone valve is configured for being closed if there is no request for heating by terminals placed downstream of the apparatus, in the secondary side, setting the flow rate selector at a flow rate value equal to zero.

In the scope of the present description and claims, with the expressions "upstream" and "downstream" it is intended—respectively—"before" and "after" with respect to the sense of the flow of fluid considered in the specific described circumstance.

The apparatus 1 of the present invention can be implemented in kit form, i.e. equipment or tools comprising various components (differential pressure regulator, three-way selection valve, two-way zone valve, optionally heat counter and one or more interception valves), where each component is intended to be installed in the plant in order to attain the operating modes of the apparatus.

Each of the components of the kit is ready to be installed in the respective position of the thermal plant. In substance, the apparatus of the present invention can be a disassembled kit (i.e. a set of components for making the apparatus) or mounted in the final use plant.

Typically the components of the apparatus are installed within a "case" or "use module", or a metering module, of a plant or of a residential unit.

The object of the present invention, in addition to the apparatus 1, is also a thermal plant 100, or a thermal plant portion, comprising:
  the primary side P;
  the secondary side S (which comprises the terminals using the fluid);
  the delivery circuit M;
  the return circuit R;
  the aforesaid apparatus 1, installed at the ends of the secondary side S in order to regulate the flow of fluid entering the secondary side from the delivery circuit M and exiting from the secondary side from the return circuit R.

Naturally the plant 100 can also only comprise the portions of primary side P, secondary side S, delivery circuit M and return circuit R, functional for completing the installation of the apparatus. For example, the plant 100 may only be composed of the portions schematically shown in the figures (even if upstream and/or downstream other non-shown elements could be present).

In the scope of the present invention, all the technical characteristics described for the apparatus 1 and its components, in particular the differential pressure regulator 2, the two-way zone valve 30 and the three-way selection valve 10, are valid and identically applicable also to the plant 100.

As an example, a method is described hereinbelow for regulating and balancing the circulation of fluid in a thermal plant, in accordance with the possible embodiments of the present invention shown in FIGS. 1-2 (first configuration), 3-4 (second configuration), 5-6 (third configuration), 7-8 (fourth configuration), 9-10 (fifth configuration), 11-12 (sixth configuration). The method comprises the steps of:
  arranging a differential pressure regulator 2, of the above-described type;
  arranging a three-way selection valve 10, of the above-described type;
  arranging a two-way zone valve 30, of the above-described type;
  executing an installation in accordance with the aforesaid first mode, i.e. executing the following steps:
    installing the differential pressure regulator 2 by placing it such that it intercepts the delivery circuit M (first and third configuration) or the return circuit (fifth configuration);
    installing the two-way zone valve 30 by placing it in a point downstream with respect to the pressure regulator 2 along the circulation sense of the fluid in the plant, intercepting the delivery circuit M (first configuration) or the return circuit R (third and fifth configuration);
    installing the three-way selection valve 10, operatively interposing it between the delivery circuit M and the return circuit R;
    fluidly connecting the first inlet/outlet terminal 11 with the high-pressure inlet 3 (third and fifth configuration) or with the low-pressure inlet 4 (first configuration) of the differential pressure regulator 2;
    fluidly connecting the low-pressure inlet 4, if the high-pressure inlet 3 is connected to the first inlet/outlet terminal 11 (third and fifth configuration), or the high-pressure inlet 3, if the low-pressure inlet 4 is connected to the first inlet/outlet terminal 11 (first configuration), with the delivery circuit M or the return circuit R, at a first connection point P1;
    fluidly connecting the second inlet/outlet terminal 12 with a second connection point P2 defined on the delivery circuit M (first configuration) or on the return circuit R (third and fifth configuration);
    fluidly connecting the third inlet/outlet terminal 13 with a third connection point P3 defined on the return circuit R, if the second inlet/outlet terminal 12 is connected to the delivery circuit M (first configuration), or on the delivery circuit M, if the second inlet/outlet terminal 12 is connected to the return circuit R (third and fifth configuration);
  or, alternatively, executing an installation in accordance with the aforesaid second mode, i.e. executing the following steps:
    installing the differential pressure regulator 2 by placing it such that it intercepts the delivery circuit M (sixth configuration) or the return circuit R (second and fourth configuration);
    installing the two-way zone valve 30 by placing it in a point upstream with respect to the pressure regulator (2) along the circulation sense of the fluid in the plant, intercepting the delivery circuit M (fourth and sixth configuration) or the return circuit R (second configuration);
    installing the three-way selection valve 10 operatively interposing it between the delivery circuit M and the return circuit R;
    fluidly connecting the first inlet/outlet terminal 11 with the high-pressure inlet 3 (second configuration) or with the low-pressure inlet 4 (fourth and sixth configuration) of the differential pressure regulator 2;
    fluidly connecting the low-pressure inlet 4, if the high-pressure inlet 3 is connected to the first inlet/outlet terminal 11 (second configuration), or the high-pressure inlet 3, if the low-pressure inlet 4 is connected to the first inlet/outlet terminal 11 (fourth and sixth configuration), with the delivery circuit M or the return circuit R, at a first connection point P1';
    fluidly connecting the second inlet/outlet terminal 12 with a second connection point P2' defined on the delivery circuit M (fourth and sixth configuration) or on the return circuit R (second configuration);
    fluidly connecting the third inlet/outlet terminal 13 with a third connection point P3' defined on the return circuit R, if the second inlet/outlet terminal 12 is connected to the delivery circuit M (fourth and sixth configuration), or on the delivery circuit M, if the second inlet/outlet terminal 12 is connected to the return circuit R (second configuration).

Preferably the method also comprises the step of selectively positioning the three-way selection valve 10 in the first operating position or in the second operating position, in a manner such to select—respectively—the first operating mode or the second operating mode.

The step of selectively positioning the three-way selection valve 10 in the first operating position or in the second operating position, in order to select the operating mode, can be executed manually, for example by means of a lever or a knob, or automatically based on a selection command sent to the three-way selection valve, e.g. by a control unit for controlling the plant.

Preferably the method can operate, instant by instant, only in one between the first or the second operating mode.

Preferably the method comprises the steps of:
arranging a heat counter 50 comprising:
- a volumetric counter 51 configured for measuring the quantity, or the flow rate, of fluid circulating in the circuit along which it is installed;
- a delivery probe 52 configured for detecting, over time, the temperature of the fluid circulating in a delivery circuit M;
- a return probe 53 configured for detecting, over time, the temperature of the fluid circulating in a return circuit R;
- a calculation unit 54 of the heat counter;

installing the volumetric counter 51 on the delivery circuit M or on the return circuit R;
placing the delivery probe 52 at a point of the delivery circuit M;
placing the return probe 53 at a point of the return circuit R;
placing the calculation unit 54 in communication with the volumetric counter 51, with the delivery probe 52 and with the return probe 53, in a manner such to receive:
- an instantaneous flow rate value measured by the volumetric counter 51;
- a delivery temperature value measured by the delivery probe 52;
- a return temperature value measured by the return probe 53;

calculating, by means of the calculation unit 54, the heat consumption, or energy consumption, associated—in a specific time interval—with the plant portion served by the differential pressure regulator 2, by the two-way zone valve 30 and by the three-way selection valve 10, i.e. downstream of such components, and in particular to the secondary side S on which they are installed.

Preferably, in the step of placing the calculation unit 54 in communication, the calculation unit continuously receives the instantaneous flow rate value, the delivery temperature value and the return temperature value, and calculates the integral thereof for obtaining the energy consumption associated with specific time intervals.

Typically the integral is calculated on the multiplication of the instantaneous flow rate by the instantaneous temperature difference between delivery and return (instantaneous power).

Preferably, in the step of calculating the heat consumption, the calculation unit 54 calculates an instantaneous power or a heat consumption/energy associated with a specific operating time interval of the plant.

As an example, in the step of installing the volumetric counter 51, this can be installed:
- if along the return circuit R (FIGS. 1 and 2), in a position upstream of the third connection point P3, which is fluidly connected with the third inlet/outlet terminal 13 of the three-way selection valve 10;
- if along the delivery circuit M (FIGS. 3 and 4), in a position downstream of the third connection point P3', which is fluidly connected with the third inlet/outlet terminal 13 of the three-way selection valve 10.

In other embodiments the volumetric counter can be installed at different points of the plant, on the delivery circuit or on the return circuit.

The apparatus of the present invention can be a disassembled kit (i.e. a set of components for making the apparatus) or mounted in the final use plant. The apparatus of the present invention is such both in disassembled condition (e.g. with the components contained in a package, intended for sale or for a place of use), and in mounted condition (i.e. the apparatus installed at a work site, in a hydraulic plant).

The invention thus conceived is susceptible of numerous modifications and variations, all falling within the scope of the inventive concept, and the abovementioned components can be replaced by other technical equivalent elements.

The invention attains important advantages. First of all, as clearly emerges from the above description, the invention allows overcoming the drawbacks of the prior art.

The apparatus and the method described above allow regulating and balancing the circulation of a fluid in a thermal plant in an effective manner.

In addition, the apparatus and the method according to the present invention—due to the combination of the differential pressure regulator, of the three-way selection valve and of the two-way zone valve, suitably connected to the delivery and return circuits of the plant—are capable of operating in two different operating modes, and allow selecting and modifying based on needs the most opportune mode to be used in each plant and at a specific moment.

In addition, the passage between the first and the second operating mode is executable with extreme ease (by simply acting on the three-way selection valve, also manually) and without having to modify anything in the installation of the apparatus or in the connection of the various components.

In substance the apparatus, and in the same manner the method, is always ready for operating in the first or in the second operating mode, as selected by the installer or by the final user.

The apparatus and the method according to the present invention advantageously allows providing different operating modes for regulating and balancing the circulation of fluid in a thermal plant.

This renders the apparatus and the method of the present invention high-performing from a standpoint of regulation and simultaneously suitable to the different needs of a user.

In addition, the apparatus according to the present invention can be installed in accordance with two different installation modes, in turn implementable in at least six different configurations—depending on the design or on the type of final use plant—without this modifying the overall operating modes and the operating possibilities.

The apparatus and the method according to the present invention are thus versatile and capable of being easily adapted to different types of plant and/or of terminals present in a plant or in a part thereof.

An important advantage of the technical solution based on the present invention is represented by the possibility of selecting the operating mode (independent of the pressure or with constant pressure difference) on the use module.

For example, it is considered that within a same building it is possible that multiple apartments are present, characterized by heating terminals of different types: several could be provided with thermostatic valves (e.g. radiators), and thus require a system with constant pressure difference (and variable flow rate), while others—e.g. mixture groups—might prefer a mode independent of the pressure (and with constant flow rate).

Additionally, within a same apartment or residential unit, different terminals can be present that are operating—alternated with each other—depending on the season: for example, radiators could be present for the winter (operating in constant pressure difference mode) and fan coil units or floor coolers for the summer (operating in constant flow rate mode). In a case of this type, due to the solution of the present invention it is possible—with the change of season—to modify the operation of the apparatus by simply manually or automatically varying the position of the three-way selection valve.

Hence, with a single apparatus it is possible to satisfy different needs; conversely, the known solutions instead require arranging a different apparatus based on the user type to be served, without being able to adapt the apparatus or vary the operating mode thereof.

A further advantage of the apparatus and of the method according to the present invention is given by the possibility to be attained and implemented in a simple and quick manner.

In addition, the apparatus and the method according to the present invention are characterized by a structure and by a simple and rational operation.

The apparatus and the method according to the present invention constitute alternative and original solutions, with respect to the prior art, for regulating and balancing the circulation of a fluid in a thermal plant.

The invention claimed is:

1. A regulation apparatus (1) for thermal plants, configured for regulating the circulation of a fluid in a thermal plant (100), said thermal plant comprising a primary side (P), which generates and provides a flow of said fluid, a secondary side (S), which comprises one or more terminals using such fluid, a delivery circuit (M), connecting the primary side (P) to the secondary side (S) in order to bring to the latter a flow of said fluid, and a return circuit (R), connecting the secondary side (S) to the primary side (P) in order to bring back, to the latter, the fluid used by said terminals, the apparatus (1) being operatively placed in the thermal plant in order to regulate the flow of fluid entering the secondary side from the delivery circuit and exiting the secondary side from the return circuit,
   the apparatus (1) comprising:
      a differential pressure regulator (2), comprising:
         an internal duct (5), intended to be traversed by the fluid intercepted by the regulator;
         a high-pressure inlet (3), intended to be placed in communication with a flow of fluid having a specific pressure;
         a low-pressure inlet (4), intended to be placed in communication with a respective flow of fluid having a specific pressure;
         the differential pressure regulator (2) being configured for varying or modulating the passage of fluid through the internal duct (5) in a manner such to maintain constant the pressure difference value between the high-pressure inlet (3) and the low-pressure inlet (4), said pressure difference value being selectable in a use interval of the differential pressure regulator (2);
      a three-way selection valve (10), comprising:
         a first inlet/outlet terminal (11), intended to be placed in fluid communication with a point of the plant or of the apparatus;
         a second inlet/outlet terminal (12), intended to be placed in fluid communication with a respective point of the plant or of the apparatus;
         a third inlet/outlet terminal (13), intended to be placed in fluid communication with a respective point of the plant or of the apparatus;
         the three-way selection valve (10) being configured at least for selectively placing in fluid communication:
            said first inlet/outlet terminal (11) with said second inlet/outlet terminal (12), simultaneously closing the third inlet/outlet terminal (13), in accordance with a first operating position, or
            said first inlet/outlet terminal (11) with said third inlet/outlet terminal (13), simultaneously closing the second inlet/outlet terminal (12), in accordance with a second operating position;
      a two-way zone valve (30), comprising:
         a fluid inlet (31);
         a fluid outlet (32);
         a passage duct (33), extending between the fluid inlet (31) and the fluid outlet (32) and intended to be traversed by the fluid intercepted by the two-way zone valve and circulating from the fluid inlet to the fluid outlet;
         the two-way zone valve (30) being configured for allowing the circulation of a fluid flow through said passage duct (33) equal to a specific flow rate value selectable for the zone valve;
   wherein the apparatus is configured for being installed in accordance with a plurality of installation modes, and wherein in each installation mode:
      the differential pressure regulator (2) can be placed so as to intercept the delivery circuit (M) or the return circuit (R), said internal duct (5) thus being traversed by the fluid circulating in the delivery circuit (M) or in the return circuit (R);
      the two-way zone valve (30) can be placed so as to intercept the delivery circuit (M) or the return circuit (R), in a manner such that said passage duct (33) is traversed by the fluid circulating in the delivery circuit (M) or in the return circuit (R);
      the three-way selection valve (10) is intended to be operatively interposed between the delivery circuit (M) and the return circuit (R);
      the first inlet/outlet terminal (11) is intended to be placed in fluid communication with the high-pressure inlet (3) or with the low-pressure inlet (4) of the differential pressure regulator (2);
      the second inlet/outlet terminal (12) is intended to be placed in fluid communication with a point of the delivery circuit (M) or of the return circuit (R);
      the third inlet/outlet terminal (13) is intended to be placed in fluid communication with a respective point of the return circuit (R), if the second inlet/outlet terminal (12) is in fluid communication with the delivery circuit (M), or of the delivery circuit (M), if the second inlet/outlet terminal (12) is in fluid communication with the return circuit (R).

2. The apparatus (1) according to claim 1 wherein, in accordance with a first installation mode of the apparatus (1):
   the differential pressure regulator (2) is placed so as to intercept the delivery circuit (M) or the return circuit (R);
   the two-way zone valve (30) is placed at a point downstream with respect to the pressure regulator (2) along the circulation sense of the fluid in the plant, intercepting the delivery circuit (M) or the return circuit (R);

or wherein, in accordance with a second installation mode of the apparatus:
the differential pressure regulator (2) is placed so as to intercept the delivery circuit (M) or the return circuit (R);
the two-way zone valve (30) is placed at a point upstream with respect to the pressure regulator (2) along the circulation sense of the fluid in the plant, intercepting the delivery circuit (M) or the return circuit (R).

3. The apparatus (1) according to claim 2, wherein the first installation mode is attained in accordance with a first configuration, in which:
the differential pressure regulator (2) and the two-way zone valve (30) are both placed along the delivery circuit (M);
the high-pressure inlet (3) of the differential pressure regulator (2) is intended to be fluidly connected with the delivery circuit (M), at a first connection point (P1) placed downstream, along the circulation sense of the fluid in the plant, with respect to the position of the differential pressure regulator (2);
the low-pressure inlet (4) of the differential pressure regulator (2) is intended to be fluidly connected with the first inlet/outlet terminal (11) of the three-way selection valve (10);
the second inlet/outlet terminal (12) of the three-way selection valve (10) is intended to be fluidly connected with the delivery circuit (M), at a second connection point (P2) placed downstream with respect to the position of the two-way zone valve (30);
the third inlet/outlet terminal (13) of the three-way selection valve (10) is intended to be fluidly connected with the return circuit (R), at a third connection point (P3).

4. The apparatus (1) according to claim 2, wherein the second installation mode is attained in accordance with a second configuration, in which:
the differential pressure regulator (2) and the two-way zone valve (30) are both placed along the return circuit (R);
the low-pressure inlet (4) of the differential pressure regulator (2) is intended to be fluidly connected with the return circuit (R), at a first connection point (P1') placed upstream, along the circulation sense of the fluid in the plant, with respect to the position of the differential pressure regulator (2);
the high-pressure inlet (3) of the differential pressure regulator (2) is intended to be fluidly connected with the first inlet/outlet terminal (11) of the three-way selection valve (10);
the second inlet/outlet terminal (12) of the three-way selection valve (10) is intended to be fluidly connected with the return circuit (R), at a second connection point (P2') placed upstream with respect to the position of the two-way zone valve (30);
the third inlet/outlet terminal (13) of the three-way selection valve (10) is intended to be fluidly connected with the delivery circuit (M), at a third connection point (P3').

5. The apparatus (1) according to claim 2, wherein the first installation mode is attained in accordance with a third configuration, in which:
the differential pressure regulator (2) is placed along the delivery circuit (M);
the two-way zone valve (30) is placed along the return circuit (R);
the low-pressure inlet (4) of the differential pressure regulator (2) is intended to be fluidly connected with the return circuit (R), at a first connection point (P1) placed downstream, along the circulation sense of the fluid in the plant, with respect to the position of the two-way zone valve (30);
the high-pressure inlet (3) of the differential pressure regulator (2) is intended to be fluidly connected with the first inlet/outlet terminal (11) of the three-way selection valve (10);
the second inlet/outlet terminal (12) of the three-way selection valve (10) is intended to be fluidly connected with the return circuit (R), at a second connection point (P2) placed upstream with respect to the position of the two-way zone valve (30);
the third inlet/outlet terminal (13) of the three-way selection valve (10) is intended to be fluidly connected with the delivery circuit (M), at a third connection point (P3).

6. The apparatus (1) according to claim 2, wherein the second installation mode is made in accordance with a fourth configuration, in which:
the differential pressure regulator (2) is placed along the return circuit (R);
the two-way zone valve (30) is placed along the delivery circuit (M);
the high-pressure inlet (3) of the differential pressure regulator (2) is intended to be fluidly connected with the delivery circuit (M), at a first connection point (P1') placed upstream, along the circulation sense of the fluid in the plant, with respect to the position of the two-way zone valve (30);
the low-pressure inlet (4) of the differential pressure regulator (2) is intended to be fluidly connected with the first inlet/outlet terminal (11) of the three-way selection valve (10);
the second inlet/outlet terminal (12) of the three-way selection valve (10) is intended to be fluidly connected with the delivery circuit (M), at a second connection point (P2') placed downstream with respect to the position of the two-way zone valve (30);
the third inlet/outlet terminal (13) of the three-way selection valve (10) is intended to be fluidly connected with the return circuit (R), at a third connection point (P3').

7. The apparatus (1) according to claim 2, wherein the first installation mode is attained in accordance with a fifth configuration, in which:
the differential pressure regulator (2) and the two-way zone valve (30) are both placed along the return circuit (R);
the low-pressure inlet (4) of the differential pressure regulator (2) is intended to be fluidly connected with the return circuit (R), at a first connection point (P1) placed downstream, along the circulation sense of the fluid in the plant, with respect to the position of the two-way zone valve (30);
the high-pressure inlet (3) of the differential pressure regulator (2) is intended to be fluidly connected with the first inlet/outlet terminal (11) of the three-way selection valve (10);
the second inlet/outlet terminal (12) of the three-way selection valve (10) is intended to be fluidly connected with the return circuit (R), at a second connection point (P2) placed upstream with respect to the position of the two-way zone valve (30);
the third inlet/outlet terminal (13) of the three-way selection valve (10) is intended to be fluidly connected with the delivery circuit (M), at a third connection point (P3).

8. The apparatus (1) according to claim 2, wherein the second installation mode is attained in accordance with a sixth configuration, in which:
- the differential pressure regulator (2) and the two-way zone valve (30) are both placed along the delivery circuit (M);
- the high-pressure inlet (3) of the differential pressure regulator (2) is intended to be fluidly connected with the delivery circuit (M), at a first connection point (P1') placed upstream, along the circulation sense of the fluid in the plant, with respect to the position of the two-way zone valve (30);
- the low-pressure inlet (4) of the differential pressure regulator (2) is intended to be fluidly connected with the first inlet/outlet terminal (11) of the three-way selection valve (10);
- the second inlet/outlet terminal (12) of the three-way selection valve (10) is intended to be fluidly connected with the delivery circuit (M), at a second connection point (P2') placed downstream with respect to the position of the two-way zone valve (30);
- the third inlet/outlet terminal (13) of the three-way selection valve (10) is intended to be fluidly connected with the return circuit (R), at a third connection point (P3').

9. The apparatus (1) according to claim 1, structured for selectively operating at least between a first operating mode and a second operating mode, selectively selectable by means of the positioning of the three-way selection valve (10), respectively in the first operating position and in the second operating position, wherein:
- in the first operating mode:
  - one from between the high-pressure inlet (3) and the low-pressure inlet (4) of the differential pressure regulator (2) detects the pressure of the fluid coming from said first connection point (P1; P1');
  - conversely, the other from between the low-pressure inlet (4) and the high-pressure inlet (3) of the differential pressure regulator (2) detects the pressure of the fluid coming from said second connection point (P2; P2'), since the three-way selection valve (10) is in the first operating position and allows a fluid communication between the first (11) and the second inlet/outlet terminal (12);
  - the third inlet/outlet terminal (13) of the three-way selection valve (10) is closed;
  - in such a manner the pressure difference between second connection point (P2; P2') and first connection point (P1; P1'), i.e. at the ends of the two-way zone valve (30), being maintained constant—in absolute value,
  - the apparatus (1) overall attaining a dynamic balancing independent of the pressure and at constant flow rate, selectable through the two-way zone valve (30), towards the secondary side (S);
- in the second operating mode:
  - one from between the high-pressure inlet (3) and the low-pressure inlet (4) of the differential pressure regulator (2) detects the pressure of the fluid coming from said first connection point (P1; P1');
  - conversely, the other from between the low-pressure inlet (4) and the high-pressure inlet (3) of the differential pressure regulator (2) detects the pressure of the fluid coming from said third connection point (P3; P3'), since the three-way selection valve (10) is in the second operating position and allows a fluid communication between the first (11) and the third inlet/outlet terminal (13);
  - the second inlet/outlet terminal (12) of the three-way selection valve (10) is closed;
  - in such a manner the pressure difference between third connection point (P3; P3') and first connection point (P1; P1'), i.e. at the ends of the entire secondary side (S), being maintained constant—in absolute value,
  - the apparatus (1) overall attaining dynamic balancing at constant pressure difference and with variable flow rate.

10. The apparatus (1) according to claim 9, wherein said first operating mode and said second operating mode are selectable, and operate in the same manner, both if the apparatus (1) is configured according to said first installation mode, and if the apparatus (1) is configured according to said second installation mode, and/or wherein said first operating mode and said second operating mode of the apparatus (1) are selectable, and operate in the same manner, both if the differential pressure regulator (2) and/or the two-way zone valve (30) are placed along the delivery circuit (M), and if the differential pressure regulator (2) and/or the two-way zone valve (30) are placed along the return circuit (R);

and/or wherein:
- the apparatus is configured for operating in said first operating mode when it is intended for regulating and balancing a secondary side of the plant in which terminals are present which require constant flows, such as for example fan coil units or injection circuits, or
- the apparatus is configured for operating in said second operating mode when it is intended for regulating and balancing a secondary side of the plant in which terminals are present which operate with variable flow rates, such as for example thermostatic valves or manifolds with multiple zones for radiant plants.

11. The apparatus (1) according to claim 1, wherein the two-way zone valve (30) comprises a flow rate selector (34) configured for defining said specific flow rate value circulating through the passage duct of the zone valve, and/or wherein the two-way zone valve (30) comprises an actuator configured for acting on said flow rate selector (34), and/or wherein said actuator is of on/off type and is configured for opening the two-way zone valve (30), with said specific flow rate value equal to an opening flow rate, or closing the zone valve with said specific flow rate value equal to zero, and/or wherein said actuator is configured for positioning said flow rate selector (34) in a plurality of discrete positions, each of which corresponding to a respective specific flow rate value, and/or wherein said actuator is configured for continuously moving said flow rate selector (34), in a manner such to be able to continuously modulate said specific flow rate value within an interval of attainable flow rate values.

12. The apparatus (1) according to claim 1, wherein the differential pressure regulator (2) comprises a body provided with said high-pressure inlet (3) and with said low-pressure inlet (4), and defining at its interior:
- a high-pressure chamber (6), connected to said high-pressure inlet; and
- a low-pressure chamber (7), connected to said low-pressure inlet, wherein, between said high-pressure chamber (6) and said low-pressure chamber (7), a movable element (8) is placed, preferably a disc or equalizing membrane, having one side under high pressure, communicating with said high-pressure chamber (6) and on which the pressure of the fluid present in the high-pressure chamber impacts, and a side under low pressure (7), communicating with said low-pressure chamber and on which the pressure of the fluid present in the low-pressure chamber impacts, and/or wherein the movable element (8) is connected to a shutter (9) active on a passage section of the internal duct (5) of the differential pressure regulator (2), in a manner such that the position and/or the shape of the movable element defines the size of the passage section of the internal duct, and a movement or contraction of the movable element varies the size of the passage section of the internal duct, and/or wherein the differential pressure regulator (2) comprises a contrast spring (C) which acts on the high-pressure chamber (6) and/or impacts on the movable element (8), the contrast spring (C) being regulatable such to define a specific position of the movable element (8) as a function of the desired pressure difference value that one intends to maintain constant between the high-pressure chamber and the low-pressure chamber, and/or wherein the differential pressure regulator (2) is configured in a manner such that variations or fluctuations of the pressure in the high-pressure chamber (6) and/or in the low-pressure chamber (7) determine the movement or the contraction of the movable element (8), on the basis of the regulation of the contrast spring (C), in a manner such to restore the selected pressure difference value between the high-pressure chamber (6) and the low-pressure chamber (7).

13. The apparatus (1) according to claim 1 wherein, with the apparatus in said first operating mode:
   the two-way zone valve (30), configured for selecting a specific flow rate of fluid passing therethrough, fixes a geometry for the fluid circulating in the secondary side;
   the differential pressure regulator (2) maintains constant the pressure difference—in absolute value—at the ends, i.e. between downstream and upstream, of the two-way zone valve (30), i.e. between second connection point (P2; P2') and first connection point (P1; P1');
   in this manner, by means of the selection operated with the two-way zone valve (30) and the action of the differential pressure regulator (2) for the maintenance of the constant pressure difference, one obtains a constant flow rate in the secondary side (S) with said fixed geometry,
and/or wherein the apparatus (1) in said first operating mode operates in a manner such that:
   the two-way zone valve (30) sets the flow rate value desired for the secondary side, i.e. it fixes the geometry;
   the differential pressure regulator (2) acts in a manner such that said desired flow rate value is actually that set;
and/or wherein, with the apparatus (1) in said second operating mode:
   the differential pressure regulator (2) works between the two ends of the secondary side (S), maintaining a constant pressure difference between delivery (M) and return (R);
   in this case, the two-way zone valve (30) is equivalent to a loss in series, on the delivery (M) or on the return (R) based on the installation mode of the apparatus.

14. The apparatus (1) according to claim 1, comprising a heat counter (50) comprising:
   a volumetric counter (51), intended to be installed on the delivery circuit (M) or on the return circuit (R), configured for measuring the quantity, or the flow rate, of fluid circulating in the circuit along which it is installed;
   a delivery probe (52), intended to be placed at a point of the delivery circuit (M) and configured for detecting, over time, the temperature of the fluid circulating in the delivery circuit;
   a return probe (53), intended to be placed at a point of the return circuit (R) and configured for detecting, over time, the temperature of the fluid circulating in the return circuit;
   a calculation unit (54) for the heat counter, in communication with the volumetric counter (51), with the delivery probe (52) and with the return probe (53), in a manner such to receive:
      an instantaneous flow rate value measured by said volumetric counter;
      a delivery temperature value measured by said delivery probe;
      a return temperature value measured by said return probe;
   the calculation unit (54) of the heat counter being configured for calculating the heat consumption, or energy consumption, associated—in a specific time interval—with the plant portion served by the apparatus (1), i.e. downstream thereof, and in particular with the secondary side (S) on which the apparatus is installed.

15. The apparatus (1) according to claim 1, wherein the apparatus (1) is composed of a set of discrete components to be assembled, i.e. a kit, each provided with a respective body intended to be placed in a specific position of the plant, and in particular comprises at least:
   a differential pressure regulator (2);
   a three-way selection valve (10);
   a two-way zone valve (30);
or wherein, alternatively, the apparatus is attained as single group comprising at its interior at least:
   a differential pressure regulator;
   a three-way selection valve;
   a two-way zone valve;
said single group being a single containment body, or module, intended to be placed in a single piece in the plant, in a manner such to intercept both the delivery circuit and the return circuit.

16. A thermal plant (100), or thermal plant portion, comprising:
   a primary side (P), which generates and supplies a flow of heating or cooling fluid;
   a secondary side (S), which comprises one or more terminals using such fluid;
   a delivery circuit (M), connecting the primary side to the secondary side in order to bring, to the latter, a flow of said fluid;
   a return circuit (R), connecting the secondary side to the primary side in order to bring back, to the latter, the fluid used by said terminals;
   a regulation apparatus (1) according to claim 1, configured for regulating the circulation of the fluid in the thermal plant, operatively placed at the ends of the secondary side (S) in order to regulate the flow of fluid entering the secondary side from the delivery circuit (M) and exiting the secondary side from the return circuit (R);
wherein:
   the differential pressure regulator (2) is placed so as to intercept the delivery circuit (M) or the return circuit (R), said internal duct (5) this being traversed by the fluid circulating in the delivery circuit (M) or in the return circuit (R);
   the two-way zone valve (30) is placed so as to intercept the delivery circuit (M) or the return circuit (R), in a manner such that said passage duct (33) is traversed by the fluid circulating in the delivery circuit (M) or in the return circuit (R);

the three-way selection valve (10) is operatively interposed between the delivery circuit (M) and the return circuit (R);

the first inlet/outlet terminal (11) is placed in fluid communication with the high-pressure inlet (3) or with the low-pressure inlet (4) of the differential pressure regulator (2);

the second inlet/outlet terminal (12) is placed in fluid communication with a respective point of the delivery circuit (M) or of the return circuit (R);

the third inlet/outlet terminal (13) is placed in fluid communication with a respective point of the return circuit (R), if the second inlet/outlet terminal (12) is in fluid communication with the delivery circuit (M), or of the delivery circuit (M), if the second inlet/outlet terminal (12) is in fluid communication with the return circuit (R).

17. A method for the regulation of the fluid circulation in a thermal plant (100) comprising:

a primary side (P), which generates and supplies a flow of heating or cooling fluid;

a secondary side (S), which comprises one or more terminals using such fluid;

a delivery circuit (M), connecting the primary side to the secondary side in order to bring, to the latter, a flow of said fluid;

a return circuit (R), connecting the secondary side to the primary side in order to bring back, to the latter, the fluid used by said terminals, the method comprising the steps of:

arranging a regulation apparatus (1) according to claim 1;

executing an installation in accordance with a first mode which provides for the following steps:

installing the differential pressure regulator (2), placing it in a manner such that it intercepts the delivery circuit (M) or the return circuit (R);

installing the two-way zone valve (30), placing it at a point downstream with respect to the pressure regulator (2) along the circulation sense of the fluid in the plant, intercepting the delivery circuit (M) or the return circuit (R);

installing the three-way selection valve (10), operatively interposing it between the delivery circuit (M) and the return circuit (R);

fluidly connecting the first inlet/outlet terminal (11) with the high-pressure inlet (3) or with the low-pressure inlet (4) of the differential pressure regulator (2);

fluidly connecting the low-pressure inlet (4), if the high-pressure inlet (3) is connected to the first inlet/outlet terminal (11), or the high-pressure inlet (3), if the low-pressure inlet (4) is connected to the first inlet/outlet terminal (11), with the delivery circuit (M) or the return circuit (R), at a first connection point (P1);

fluidly connecting the second inlet/outlet terminal (12) with a second connection point (P2) defined on the delivery circuit (M) or on the return circuit (R);

fluidly connecting the third inlet/outlet terminal (13) with a third connection point (P3) defined on the return circuit (R), if the second inlet/outlet terminal (12) is connected to the delivery circuit (M), or on the delivery circuit (M), if the second inlet/outlet terminal (12) is connected to the return circuit (R);

or, alternatively, executing an installation in accordance with a second mode which provides for the following steps:

installing the differential pressure regulator (2), placing it in a manner such that it intercepts the delivery circuit (M) or the return circuit (R);

installing the two-way zone valve (30), placing it at a point upstream with respect to the pressure regulator (2) along the circulation sense of the fluid in the plant, intercepting the delivery circuit (M) or the return circuit (R);

installing the three-way selection valve (10), operatively interposing it between the delivery circuit (M) and the return circuit (R);

fluidly connecting the first inlet/outlet terminal (11) with the high-pressure inlet (3) or with the low-pressure inlet (4) of the differential pressure regulator (2);

fluidly connecting the low-pressure inlet (4), if the high-pressure inlet (3) is connected to the first inlet/outlet terminal (11), or the high-pressure inlet (3), if the low-pressure inlet (4) is connected to the first inlet/outlet terminal (11), with the delivery circuit (M) or the return circuit (R), at a first connection point (P1');

fluidly connecting the second inlet/outlet terminal (12) with a second connection point (P2') defined on the delivery circuit (M) or on the return circuit (R);

fluidly connecting the third inlet/outlet terminal (13) with a third connection point (P3') defined on the return circuit (R), if the second inlet/outlet terminal (12) is connected to the delivery circuit (M), or on the delivery circuit (M), if the second inlet/outlet terminal (12) is connected to the return circuit (R).

18. The method according to claim 17, also comprising the step of selectively positioning the three-way selection valve (10) in the first operating position or in the second operating position, in a manner such to select-respectively-a first operating mode or a second operating mode, wherein:

in the first operating mode:

one between the high-pressure inlet (3) and the low-pressure inlet (4) of the differential pressure regulator (2) detects the pressure of the fluid coming from said first connection point (P1; P1');

conversely, the other between the low-pressure inlet (4) and the high-pressure inlet (3) of the differential pressure regulator (2) detects the pressure of the fluid coming from said second connection point (P2; P2'), since the three-way selection valve is in the first operating position and allows the fluid communication between the first and the second inlet/outlet terminal;

the third inlet/outlet terminal (13) of the three-way selection valve is closed;

the pressure difference between the second connection point (P2; P2') and the first connection point (P1; P1'), i.e. at the ends of the two-way zone valve (30), is maintained constant—in absolute value;

the method overall attains a dynamic balancing independent of the pressure and with constant flow rate, selectable by means of the two-way zone valve, towards the secondary side;

in the second operating mode:

one between the high-pressure inlet (3) and the low-pressure inlet (4) of the differential pressure regulator (2) detects the pressure of the fluid coming from said first connection point (P1; P1');

conversely, the other between the low-pressure inlet (4) and the high-pressure inlet (3) of the differential pressure regulator (2) detects the pressure of the fluid coming from said third connection point (P3; P3'), since the three-way selection valve is in the second operating position and allows the fluid communication between the first and the third inlet/outlet terminal;

the second inlet/outlet terminal (12) of the three-way selection valve is closed;

the pressure difference between the third connection point (P3; P3') and the first connection point (P1; P1'), i.e. at the ends of the entire secondary side (S), is maintained constant—in absolute value;

the method overall attains, at the ends of the secondary side (S), a dynamic balancing with constant pressure different and variable flow rate.

\* \* \* \* \*